United States Patent
Wada

(10) Patent No.: US 7,746,433 B2
(45) Date of Patent: Jun. 29, 2010

(54) LIQUID CRYSTAL DISPLAY AND ELECTRONIC APPARATUS

(75) Inventor: Hiroshi Wada, Azumino (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 204 days.

(21) Appl. No.: 12/107,952

(22) Filed: Apr. 23, 2008

(65) Prior Publication Data

US 2008/0316399 A1 Dec. 25, 2008

(30) Foreign Application Priority Data

May 1, 2007 (JP) ............................. 2007-120547
Mar. 21, 2008 (JP) ............................. 2008-073037

(51) Int. Cl.
*G02F 1/1333* (2006.01)
*G02F 1/1335* (2006.01)

(52) U.S. Cl. ...................... 349/114; 349/117

(58) Field of Classification Search ................ 349/117, 349/113, 120, 119, 118, 57, 187

See application file for complete search history.

(56) References Cited

U.S. PATENT DOCUMENTS

| 5,343,317 | A | 8/1994 | Wada et al. | |
| 5,396,355 | A | 3/1995 | Wada et al. | |
| 5,601,884 | A * | 2/1997 | Ohnishi et al. | 428/1.52 |
| 7,365,816 | B2 * | 4/2008 | Kawai et al. | 349/118 |
| 7,593,077 | B2 * | 9/2009 | Kim et al. | 349/114 |
| 7,599,029 | B2 * | 10/2009 | Shibazaki | 349/120 |
| 7,623,207 | B2 * | 11/2009 | Lyu | 349/117 |
| 2007/0177086 | A1 * | 8/2007 | Ishitani et al. | 349/117 |

FOREIGN PATENT DOCUMENTS

| JP | A-10-177168 | 6/1998 |
| JP | A-2004-037993 | 2/2004 |
| JP | A-2004-038145 | 2/2004 |
| JP | A-2005-274675 | 10/2005 |
| JP | A-2005-338256 | 12/2005 |
| JP | A-2006-126602 | 5/2006 |

* cited by examiner

*Primary Examiner*—Akm E Ullah
(74) *Attorney, Agent, or Firm*—Oliff & Berridge, PLC

(57) ABSTRACT

A liquid crystal display includes an element substrate, pixel electrodes and a common electrode that are formed on the element substrate, a counter substrate, a liquid crystal layer that is formed between the counter substrate and the element substrate, first and second polarizing plates that are provided on an emitting side of display light and an opposite side, respectively, and a retardation film that is provided in a reflective region to be disposed between the liquid crystal layer and the first polarizing plate. Each pixel has a transmissive region where transmissive display light is emitted and a reflective region where reflective display light is emitted. The retardation of the retardation film has smaller temperature dependency than the retardation of the liquid crystal layer.

9 Claims, 12 Drawing Sheets

LIQUID CRYSTAL DISPLAY AND ELECTRONIC APPARATUS

The entire disclosure of Japanese Patent Application Nos. 2007-120547, filed May 1, 2007 and 2008-073037, filed Mar. 21, 2008 are expressly incorporated by reference herein.

BACKGROUND

1. Technical Field

The present invention relates to a liquid crystal display that drives liquid crystal by means of a transverse electric field, and an electronic apparatus having the same. In particular, the present invention relates to a transflective liquid crystal display that includes a plurality of pixels, each having a transmissive region and a reflective region, and a retardation film being formed in the reflective region.

2. Related Art

Recently, for the purpose of realizing a wide viewing angle of a liquid crystal display used in a cellular phone or a mobile computer, liquid crystal displays, such as an FFS (Fringe Field Switching) mode liquid crystal display and an IPS (In Plane Switching) mode liquid crystal display, which drive liquid crystal by means of a transverse electric field, have been put to practical use. Such liquid crystal displays include a transflective liquid crystal display, which a plurality of pixels each having a transmissive region and a reflective region.

Supposing the effect of a viewing angle dependency of a retardation plate is minimized, in order to eliminate a difference in retardation when the length of a path followed by light varies in a transmissive mode and a reflective mode, the following configuration is suggested (see JP-A-2005-338256):

(a) a retardation film is provided in the reflective region,
(b) a first polarizing plate and a second polarizing plate are disposed such that their polarization axes are perpendicular to each other,
(c) an alignment direction of liquid crystal is in parallel with the polarization axis of the first polarizing plate,
(d) an angle between a slow axis of the retardation film and the polarization axis of the first polarizing plate is approximately 22.5°,
(e) the retardation of a liquid crystal layer in the reflective region is quarter wavelength, and
(f) the retardation of the retardation film is half wavelength.

That is, on the condition that display in the transmissive mode is not obstructed, the retardation film is only formed in the reflective region. Simultaneously, the polarization axis of the polarizing plate and the alignment direction of liquid crystal are set to be in parallel with each other or perpendicular to each other. In addition, the phase difference of the liquid crystal layer in the reflective region is set to be quarter wavelength, and the phase difference in the retardation film is set to be half wavelength.

However, a portable electronic apparatus, such as a cellular phone or a mobile computer, is used outdoor, as well as indoor, and a usage environmental temperature is changed. Nevertheless, in the liquid crystal display described in JP-A-2005-338256, a display characteristic when the usage environment temperature is changed is not taken into consideration. For this reason, when the liquid crystal display disclosed in JP-A-2005-338256 is used at a temperature other than a room temperature, there is a problem in that the contrast of an image displayed in the reflective mode is degraded.

SUMMARY

In order to solve at least some of the above-described problems, the inventors have examined how the temperature dependency of a retardation of the liquid crystal layer in the reflective region and the temperature dependency of a retardation of the retardation film affect the contrast of an image displayed in the reflective mode. And, the inventors have found that, when the retardation of the retardation film has smaller temperature dependency than that of the liquid crystal layer, image display in the reflective mode can be performed with high contrast over a wide temperature range. The invention has been accomplished based on this finding and can be embodied as the following aspects.

According to an aspect of the invention, a liquid crystal display includes an element substrate, a pixel electrode that is formed at each pixel of the element substrate, a common electrode that is formed on the element substrate, an electric field being formed between the pixel electrodes and the common electrode, a counter substrate that is arranged to face the element substrate, a liquid crystal layer that is formed between the counter substrate and the element substrate, first and second polarizing plates that are provided on an emitting side of display light passing through the liquid crystal layer and an opposite side, respectively, and a retardation film that is disposed between the liquid crystal layer and the first polarizing plate. The pixel has a transmissive region where transmissive display light is emitted and a reflective region where reflective display light is emitted. The retardation of the retardation film has smaller temperature dependency than that of the liquid crystal layer.

With this configuration, the retardation of the retardation film provided in the reflective region has smaller temperature dependency than that of the liquid crystal layer. For this reason, in the reflective mode, the liquid crystal display can perform image display with high contrast over a wide temperature range. Therefore, even if a usage environment temperature is changed, the liquid crystal display can perform high-quality image display.

In the liquid crystal display according to the aspect of the invention, the counter substrate may be arranged on the emitting side of display light, and the retardation film may be formed on a surface of the counter substrate facing the liquid crystal layer.

With this configuration, the retardation film is formed on the surface of the counter substrate facing the liquid crystal layer. Therefore, in the usage environment of the liquid crystal display, the temperature conditions of the retardation film and the liquid crystal layer can be substantially made uniform.

In the liquid crystal display according to the aspect of the invention, in the reflective region, a light reflecting layer may be formed on a surface of the element substrate facing the liquid crystal layer, and the retardation film may be formed to overlap the light reflecting layer in plan view.

With this configuration, the retardation film overlaps the light reflecting layer in plan view. Therefore, even if the usage environment temperature is changed, in respects to light, which is incident on the liquid crystal display and reflected from the light reflecting layer, a desired phase difference can be made in the reflective region.

In the liquid crystal display according to the aspect of the invention, one of the pixel electrode and the common electrode may be formed on the element substrate facing the liquid crystal layer, and may have a plurality of slit-shaped openings, which are formed within each region of the pixel at predetermined intervals.

With this configuration, an FFS mode liquid crystal display that drives liquid crystal by means of a transverse electric field can be easily implemented.

In the liquid crystal display according to the aspect of the invention, the pixel electrode may be formed closer to the liquid crystal layer than the common electrode.

In the liquid crystal display according to the aspect of the invention, the common electrode may be formed closer to the liquid crystal layer than the pixel electrode.

In the liquid crystal display according to the aspect of the invention, the pixel electrode and the common electrode may be formed in the same layer in the element substrate and have a comb shape, and the tooth portions of the comb shape may be arranged in alternate relationship to face each other.

With this configuration, an IPS mode liquid crystal display that drives liquid crystal by means of a transverse electric field can be easily implemented.

According to another aspect of the invention, an electronic apparatus includes the above-described liquid crystal display.

With this configuration, the electronic apparatus includes a liquid crystal display that, in the reflective mode, can perform image display with high contrast over a wide temperature range. Therefore, even if a usage environment temperature is changed, high-quality image display can be performed.

BRIEF DESCRIPTION OF THE DRAWINGS

The invention will be described with reference to the accompanying drawings, wherein like numbers reference like elements

FIG. 3C is an explanatory view showing the arrangement directions of polarizing plates and the like.

FIG. 8B is an explanatory view showing the arrangement directions of polarizing plates and the like.

FIG. 9B is an explanatory view showing the arrangement directions of polarizing plates and the like.

FIG. 10B is an explanatory view showing the arrangement directions of polarizing plates and the like.

DESCRIPTION OF EXEMPLARY EMBODIMENTS

Figure 1A:
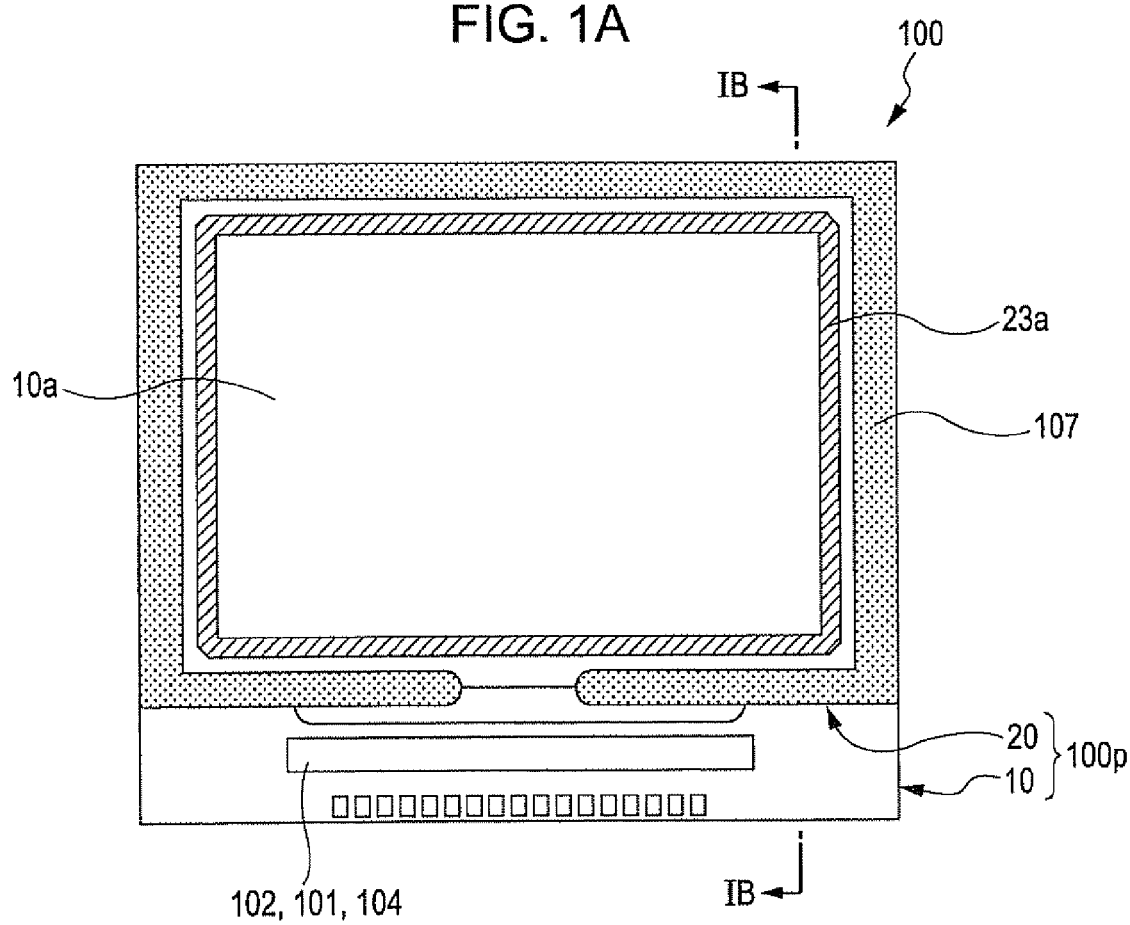
FIG. 1A is a plan view showing a liquid crystal display according to a first embodiment of the invention, together with constituent elements formed thereon, as viewed from a counter substrate.

Exemplary embodiments of the invention will now be described. In the drawings, the scale of each layer or each member has been adjusted so as to be of a recognizable size.

First Embodiment

Overall Configuration

Figure 1B:
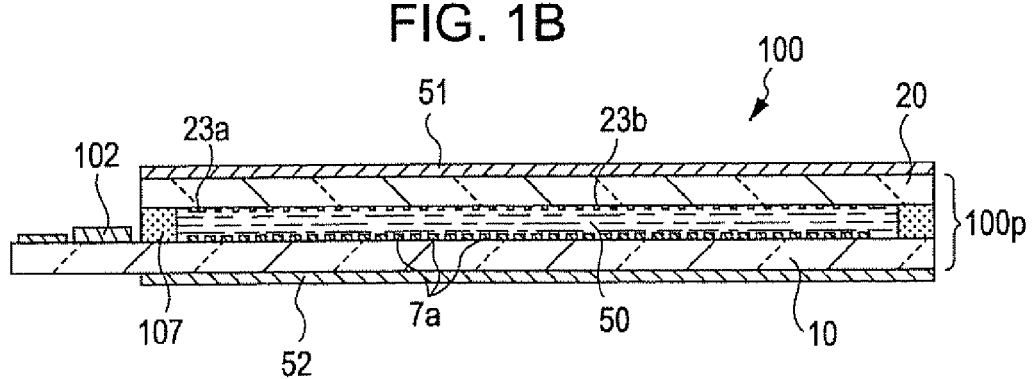
FIG. 1B is a cross-sectional view taken along the line IB-IB of FIG. 1A.

FIG. 1A is a plan view showing a liquid crystal display according to a first embodiment of the invention, together with constituent elements formed thereon, as viewed from a counter substrate. FIG. 1B is a cross-sectional view taken along the line IB-IB of FIG. 1A.

In FIGS. 1A and 1B, a liquid crystal display 100 according to this embodiment is a transflective active-matrix-type liquid crystal display. A liquid crystal panel 100p includes an element substrate 10, a counter substrate 20 that is arranged to face the element substrate 10, and a homogeneously aligned liquid crystal layer 50 that is disposed between the counter substrate 20 and the element substrate 10. On the element substrate 10, a sealant 107 is formed along the edge of the counter substrate 20, such that the counter substrate 20 and the element substrate 10 are bonded to each other with the sealant 107. A driving IC 102 including a data line driving circuit 101 and a scanning line driving circuit 104 is mounted on the element substrate 10 side. The liquid crystal layer 50 is a liquid crystal composition having a positive dielectric anisotropy, in which the dielectric constant in an alignment direction larger than that in a normal direction, and shows a nematic phase over a wide temperature range.

Although the details will be described below, a plurality of pixel electrodes 7a are formed in a matrix on the element substrate 10. A frame-shaped light-shielding layer 23a formed of a light-shielding material is formed on the counter substrate 20 inside the sealant 107. The region inside the sealant 107 becomes an image display region 10a. A light-shielding layer 23b, which is called a black matrix or a black stripe, is formed on the counter substrate 20 to face a boundary between the pixel electrodes 7a of the element substrate 10.

The liquid crystal display 100 of this embodiment drives the liquid crystal layer 50 in an FFS mode. For this reason, a common electrode described below (not shown in FIGS. 1A and 1B) is formed on the element substrate 10, in addition to the pixel electrodes 7a. A counter electrode is not formed on the counter substrate 20.

In the liquid crystal display 100 having the above-described configuration, the liquid crystal panel 100p is arranged such that the counter substrate 20 is disposed on an emitting side of display light passing through the liquid crystal layer 50. A first polarizing plate 51 and a second polarizing plate 52 are arranged on the counter substrate 20 side and the element substrate 10 side with respect to the liquid crystal panel 100p, respectively. In addition, a backlight (not shown) is arranged on the element substrate 10 side with respect to the liquid crystal panel 100p.

Electrical Configuration of Liquid Crystal Display

Figure 2:
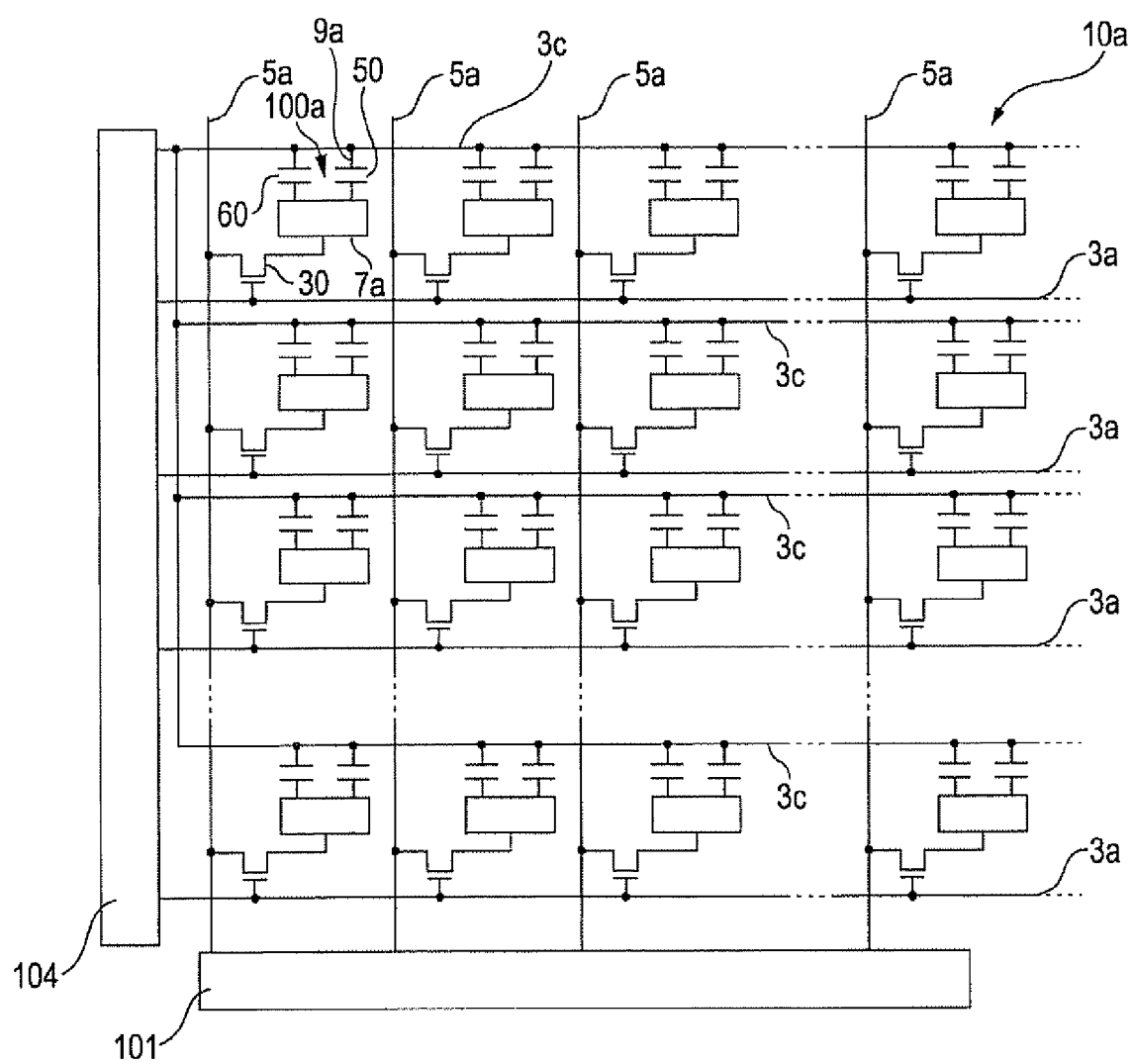
FIG. 2 is an equivalent circuit diagram showing the electrical configuration of an image display region on an element substrate, which is used in the liquid crystal display according to the first embodiment.

FIG. 2 is an equivalent circuit diagram showing the electrical configuration of the image display region 10a on the element substrate 10, which is used in the liquid crystal display 100 according to the first embodiment. As shown in FIG. 2, a plurality of pixels 100a are formed in a matrix in the image display region 10a of the liquid crystal display 100. At each of the plurality of pixels 100a, the pixel electrode 7a and a pixel switching thin film transistor 30 for controlling the pixel electrode 7a are formed. In addition, in each of the plurality of pixels 10a, a common electrode 9a is formed such that a transverse electric field is formed between the common electrode 9a and the pixel electrode 7a. The common electrode 9a is electrically connected to a common wiring line 3c. In FIG. 2, the common electrode 9a is connected to the common wiring line 3c, but the common electrode 9a may be substantially formed on the entire surface of the image display region 10a of the element substrate 10.

A data line 5a is electrically connected to a source of the thin film transistor 30. Data signals are linear-sequentially supplied to the data lines 5a from the data line driving circuit 101. A scanning line 3a is electrically connected to a gate of the thin film transistor 30. Scanning signals are linear-sequentially supplied to the scanning lines 3a from the scanning line driving circuit 104. The pixel electrode 7a is electrically connected to a drain of the thin film transistor 30 so as to turn on the thin film transistor 30 for a predetermined period. Then, the data signals, which are supplied from the data lines 5a, are written in the pixels 100a at a predetermined timing. In this way, a pixel signal at a predetermined level written in the liquid crystal layer 50 shown in FIG. 1B through the pixel electrode 7a is held between the pixel electrode 7a and the common electrode 9a on the element substrate 10 for a predetermined period. A storage capacitor 60 is formed between the pixel electrode 7a and the common electrode 9a. The voltage of the pixel electrode 7a is maintained for a period of time, for example, three digits longer than the time of application of a source voltage. With this structure, the liquid crystal display 100 that has an improved charge maintaining property and can perform display in a high contrast ratio can be implemented.

Configuration of Pixel

Figure 3A:
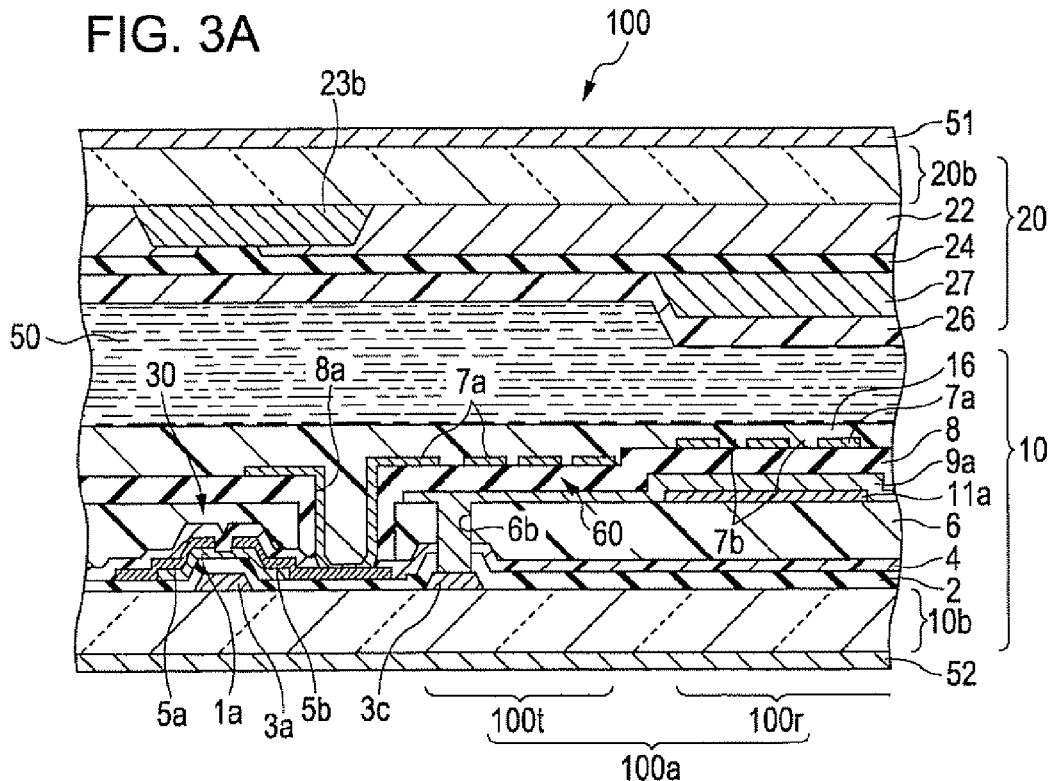
FIG. 3A is a cross-sectional view of a pixel in the liquid crystal display according to the first embodiment taken along the line IIIA-IIIA of FIG. 3B.
Figure 3B:
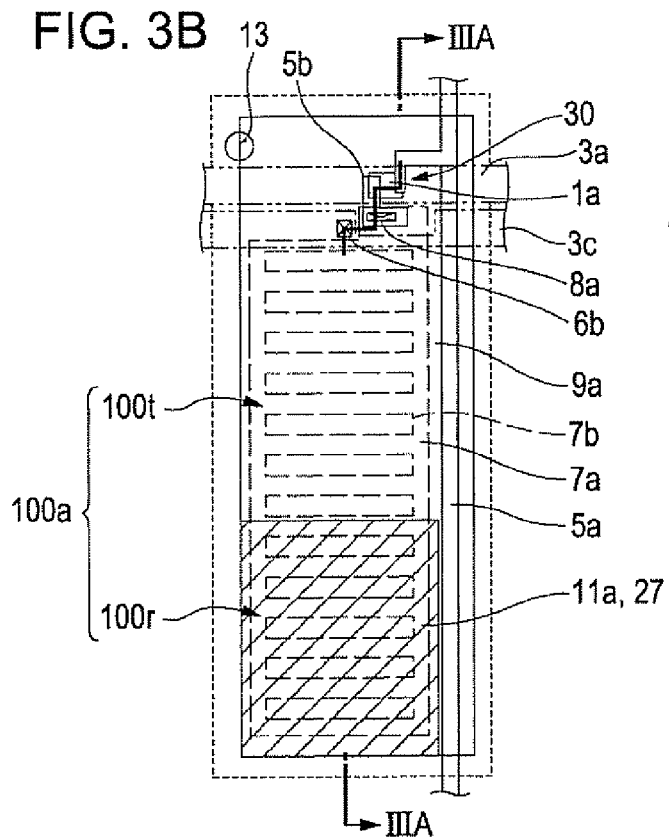
FIG. 3B is plan view corresponding to FIG. 3A.
Figure 3C:
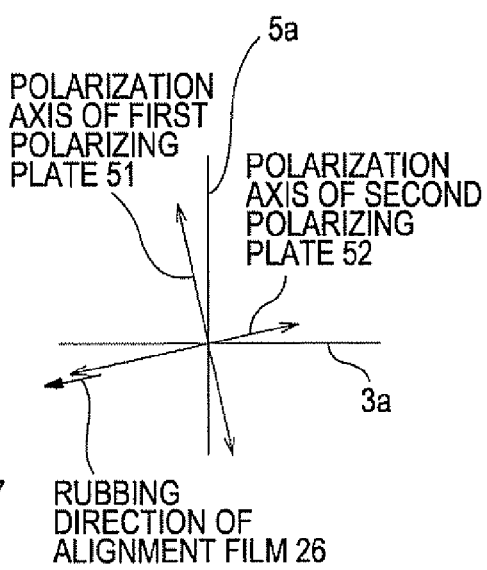

FIG. 3A is a cross-sectional view of a pixel in the liquid crystal display 100 according to the first embodiment. FIG. 3B is a plan view corresponding to FIG. 3A. FIG. 3C is an explanatory view showing the arrangement directions of polarizing plates and the like. FIG. 3A is a cross-sectional view of the liquid crystal display 100 taken along the line IIIA-IIIA of FIG. 3B. In FIG. 3B, the pixel electrode 7a is indicated by a broken line, and the scanning line 3a and the wiring lines formed simultaneously with the scanning line 3a are indicated by two-dot-chain lines. In addition, the data line 5a, and the thin film transistor and the like simultaneously formed with the data line 5a are indicated by solid lines. In FIG. 3B, reflective region 100r where the retardation film 27 or the light reflecting layer 11a is formed is diagonally shaded.

As shown in FIGS. 3A and 3B, the transparent pixel electrodes 7a formed of an ITO (Indium Tin Oxide) film are formed in a matrix on the element substrate 10 to correspond to the pixels 100a. The data line 5a and the scanning line 3a, which are electrically connected to the thin film transistor 30 (pixel switching element), are formed along the boundary between the pixel electrodes 7a. In addition, the common line 3c is formed to be in parallel with the scanning line 3a. The common line 3c is a wiring layer that is formed simultaneously with the scanning line 3a. The transparent common electrode 9a formed of an ITO film is electrically connected to the common line 3c through a contact hole 6b. The common electrode 9a is formed on the entire surface of the substrate, and a plurality of slit-shaped openings 7b (indicated by a broken line) are formed in the pixel electrode 7a.

Referring to FIG. 3A, the base substance of the element substrate 10 is a transparent substrate 10b, such as a quartz substrate or a heat-resistant glass substrate. The base substrate of the counter substrate 20 is a transparent substrate 20b, such as a quartz substrate or a heat-resistant glass substrate. In this embodiment, a glass substrate is used for the transparent substrate 10b or 20b.

Referring to FIGS. 3A and 3B, in the element substrate 10, a base protective film (not shown) formed of a silicon oxide film is formed on the surface of the transparent substrate 10b. On the surface of the protective film, a bottom gate-type thin film transistor 30 is formed at a position near the pixel electrode 7a. In the thin film transistor 30, a gate electrode, which is a part of the scanning line 3a, a gate insulating layer 2, a semiconductor layer 1a, which is formed of an amorphous silicon film to form an active layer of the thin film transistor 30, and a contact layer (not shown) are laminated in that order. The data line 5a overlaps the semiconductor layer 1a at a source end with the contact layer interposed therebetween, and the overlap portion of the data line 5a functions as a source electrode. A drain electrode 5b overlaps the semiconductor layer 1a with the contact layer interposed therebetween. The data line 5a and the drain electrode 5b are formed of conductive films simultaneously formed. A protective film 4 formed of a silicon nitride film or the like is formed on the surfaces of the data line 5a and the drain electrode 5b. A resin layer 6 formed of photosensitive resin, such as acrylic resin or the like, is formed on the protective film 4.

The common electrode 9a formed of an ITO film is formed on the entire surface of the resin layer 6. The common electrode 9a is electrically connected to the common line 3c via a contact hole 6b, which is formed to pass through the resin layer 6, the protective film 4, and the gate insulating layer 2. An inter-electrode insulating film 8 formed of a silicon oxide film or a silicon nitride film is formed on the surface of the common electrode 9a. The pixel electrode 7a formed of an ITO film is formed on the inter-electrode insulating film, and the pixel electrode 7a is provided with the above-described slit-shaped openings 7b. An alignment film 16 is formed on the surface of the pixel electrode 7a. The alignment film 16 is formed of a polyimide resin film, which is aligned by a linear rubbing treatment. A portion of the liquid crystal layer 50 near the alignment film 16 is aligned according to the rubbing direction of the alignment film 16.

The common electrode 9a and the pixel electrode 7a, which is formed closer to the liquid crystal layer 50 than the common electrode 9a, face each other with the inter-electrode insulating film 8 interposed therebetween. The storage capacitor 60 is formed with the inter-electrode insulating film 8 as a dielectric film. In this embodiment, the pixel electrode 7a is electrically connected to the drain electrode 5b via a contact hole 8a, which is formed in the inter-electrode insulating film 8, the resin layer 6, and the protective film 4. In the element substrate 10 having the above-described configuration, the liquid crystal layer 50 in and around the slit-shaped openings 7b by a transverse electric field, which is formed between the pixel electrode 7a and the common electrode 9a.

In the counter substrate 20, the light-shielding layer 23b is formed on the inner surface of the transparent substrate 20b (a surface on which the liquid crystal layer 50 is disposed) to face the thin film transistor 30. Color filters 22 for respective colors are formed in the regions defined by the light-shielding layer 23b. The light-shielding layer 23b and the color filters 22 are covered with an insulating protective film 24. An alignment film 26 is formed on the surface of the insulating protective film 24. The alignment film 26 is formed of a polyimide resin film, which is aligned by a linear rubbing treatment. A portion of the liquid crystal layer 50 near the alignment film 26 is aligned according to the rubbing direction of the alignment. Here, the alignment treatments on the alignment films 16 and 26 are performed to be anti-parallel to each other. That is, the rubbing direction of the alignment film 16 is opposite to the rubbing direction of the alignment film 26. For this reason, the liquid crystal layer 50 can be homogeneously aligned.

As shown in FIG. 3B, a columnar protrusion 13 (not shown in FIG. 3A) formed of photosensitive resin is formed on the element substrate 10 between the element substrate 10 and the counter substrate 20. With the columnar protrusion 13, the element substrate 10 and the counter substrate 20 are spaced apart at a predetermined gap from each other.

Detailed Configuration of Pixel

The liquid crystal display 100 of this embodiment is a transflective type, and each of the plurality of pixels 100a has a transmissive region loot where image display is performed in a transmissive mode and a reflective region 100r where image display is performed in a reflective mode. That is, in the reflective region 100r, the light reflecting layer 11a formed of aluminum, silver, or an alloy thereof is formed on the resin layer 6. The common electrode 9a, the inter-electrode insulating film 8, and the pixel electrode 7a are formed on the light reflecting layer 11a. In the reflective region 100r, concavo-convexes are formed on the surface of the resin layer 6, which overlaps the light reflecting layer 11a, such that the surface of the light reflecting layer 11a can have a light scattering property.

In the liquid crystal display 100 having the above-described configuration, light emitted from a backlight (not shown) passes through the transmissive region loot and is then emitted from the counter substrate 20 side as transmissive display light while being modulated by the liquid crystal layer 50. In addition, external light, which is incident on the reflective region 100r from the counter substrate 20 side, is reflected from the light reflecting layer 11a and then emitted from the counter substrate 20 side as reflective display light while being modulated by the liquid crystal layer 50. Accordingly, the length of a path followed by light varies between the transmissive mode and the reflective mode.

In this embodiment, therefore, the retardation film 27 is formed between the first polarizing plate 51 and the liquid crystal layer 50. Specifically, on the inner surface of the counter substrate 20 (a surface on which the liquid crystal layer 50 is disposed), the retardation film 27 is formed in a region corresponding to the reflective region 100r to overlap the light reflecting layer 11a in plan view. The alignment film 26 is formed to cover the retardation film 27. For this reason, even if the length of the path followed by light varies between the transmissive mode and the reflective mode, the retardations in both modes can be adjusted. Though not shown, in defining the direction of the slow axis of the retardation film 27, an alignment film is formed with the retardation film 27 as a base, and a rubbing treatment or an optical alignment treatment is carried out on the alignment film. In this way, the direction of the slow axis of the retardation film 27 is set. The alignment film may be formed by an oblique deposition method.

Optical Configuration

In the liquid crystal display 100 having the above-described configuration, as the liquid crystal display 100 is viewed from a normal direction, the plurality of slit-shaped openings 7b are formed in parallel with each other, and extend in parallel with the scanning line 3a (a short-side direction of the pixel 100a). For this reason, the direction of the electric field is perpendicular to the scanning line 3a.

In addition, as shown in FIG. 3C, the alignment film 26 on the counter substrate 20 side is subjected to a rubbing treatment at 5° in a counterclockwise direction with respect to the extension direction of the openings 7b (the direction parallel to the scanning line 3a or the short-side direction of the pixel 100a). The alignment film 16 on the element substrate 10 side is subjected to a rubbing treatment in a direction opposite to the rubbing direction of the alignment film 26. For this reason, the liquid crystal layer 50 can be homogeneously aligned, and also a threshold voltage can be reduced.

The first polarizing plate 51 and the second polarizing plate 52 are arranged such that their polarization axes are perpendicular to each other. Further, the polarization axis of the first polarizing plate 51 is perpendicular to the rubbing direction of the alignment film 16 or 26, and the polarization axis of the second polarizing plate 52 is in parallel with the rubbing direction of the alignment film 16 or 26.

In the liquid crystal display 100 having the above-described configuration, according to this embodiment, the retardation Δnd of the liquid crystal layer 50 in the reflective region 100r is set to be quarter wavelength, and the retardation R of the retardation film 27 is set to be half wavelength. That is, based on light having a wavelength 550 nm with the maximum human visual sensitivity in the visible light region, the retardation Δnd of the liquid crystal layer 50 in the reflective region 100r is set to 124 nm at 25° C., and the retardation R of the retardation film 27 is set to 251 nm at 25° C. Moreover, the slow axis of the retardation film 27 makes an angle of 22.5° or 67.5° with the polarization axis of the first polarizing plate 51. The angle is set to be in a range of 20° to 25° or 60° to 75° with an allowable range of ±10%. In addition, the retardation Δnd of the liquid crystal layer 50 is shifted by quarter wavelength between the transmissive region loot and the reflective region 100r.

For this reason, according to this embodiment, in the reflective region 100r, incident light converted into linearly polarized light by the first polarizing plate 51 is converted into linearly polarized light having a different oscillation direction by the retardation film 27, and is then converted into circularly polarized light by the liquid crystal layer 50. Accordingly, in the reflective region 100r, when no voltage is applied, incident light becomes circularly polarized light or nearly circularly polarized light and is then incident on the light reflecting layer 11a. Therefore, light, which is reflected from the light reflecting layer 11a and is incident on the first polarizing plate 51 again, becomes linearly polarized light whose oscillation direction is perpendicular to the polarization axis of the first polarizing plate 51, that is, linearly polarized light that is in parallel with the absorption axis of the first polarizing plate 51. For this reason, when no voltage is applied, similarly to the transmissive region 100t, in the reflective region 100r, achromatic dark display is achieved.

Optimization of Retardation of Liquid Crystal Layer and Retardation Film

Figure 4:
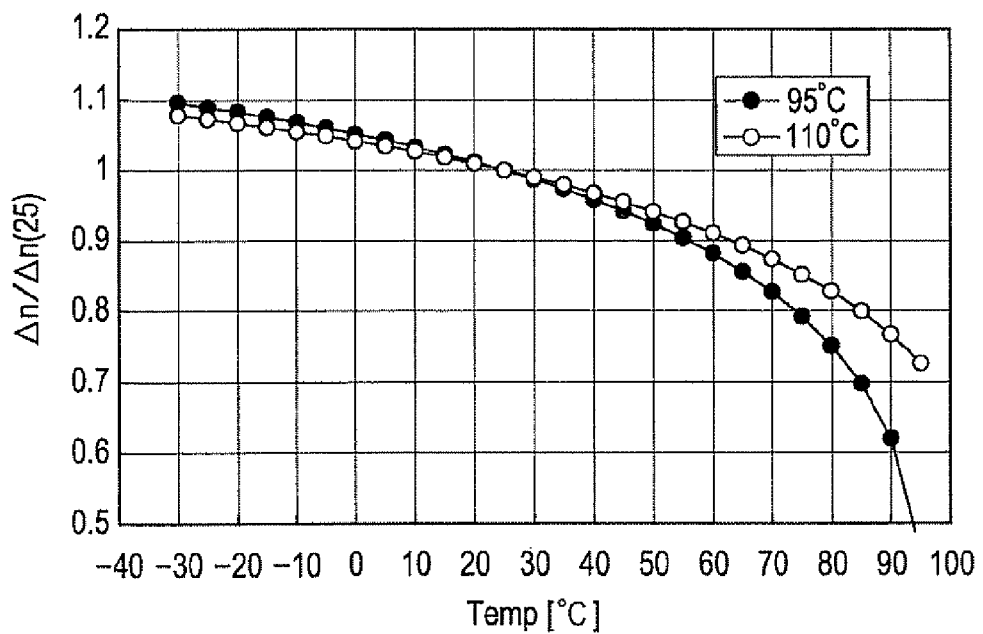
FIG. 4 is a graph showing temperature dependency (change rate of Δn at 25° C.) of birefringences Δn of two liquid crystal materials having NI points (nematic/isotropic phase transition temperature) of 95° C. and 110° C., respectively.
Figure 5:
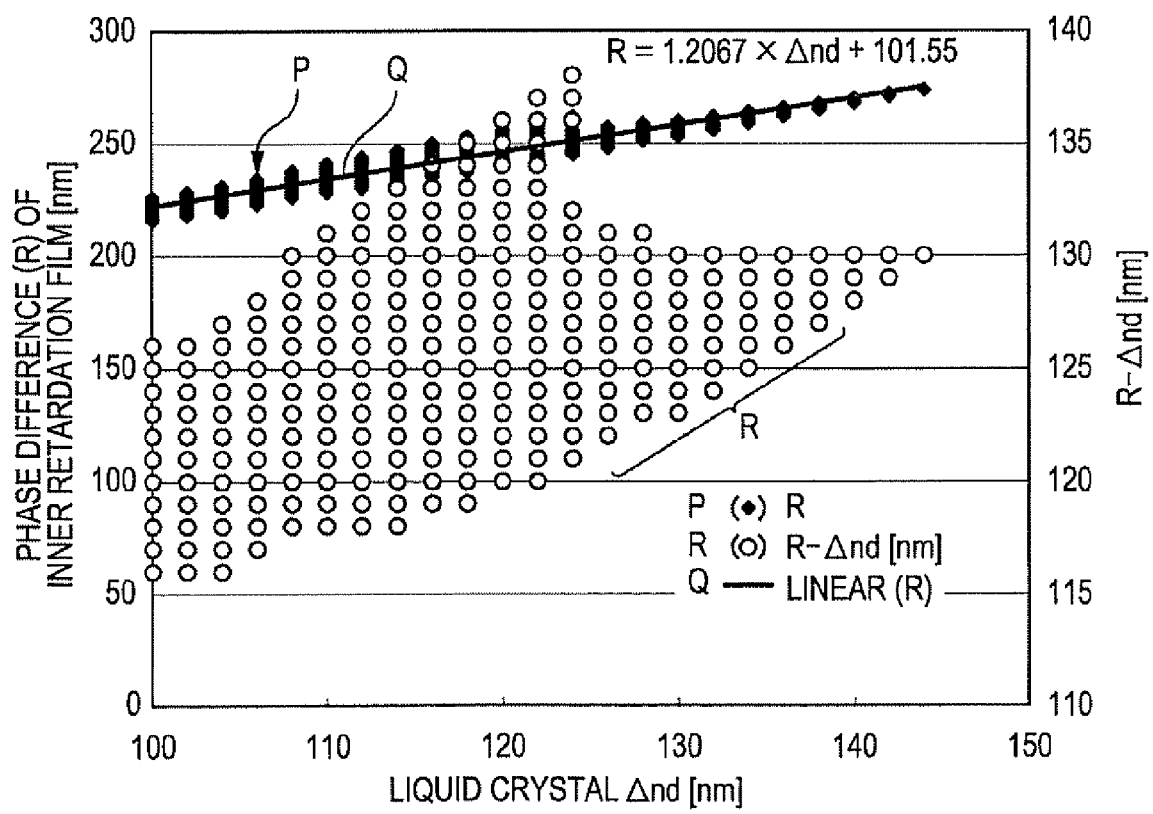
FIG. 5 is a graph showing, in a liquid crystal display, when the retardation Δnd of a liquid crystal layer is changed, a simulation result on the range of the retardation of a retardation film satisfying the condition that emittance (reflectance) is less than 0.4%.
Figure 6:
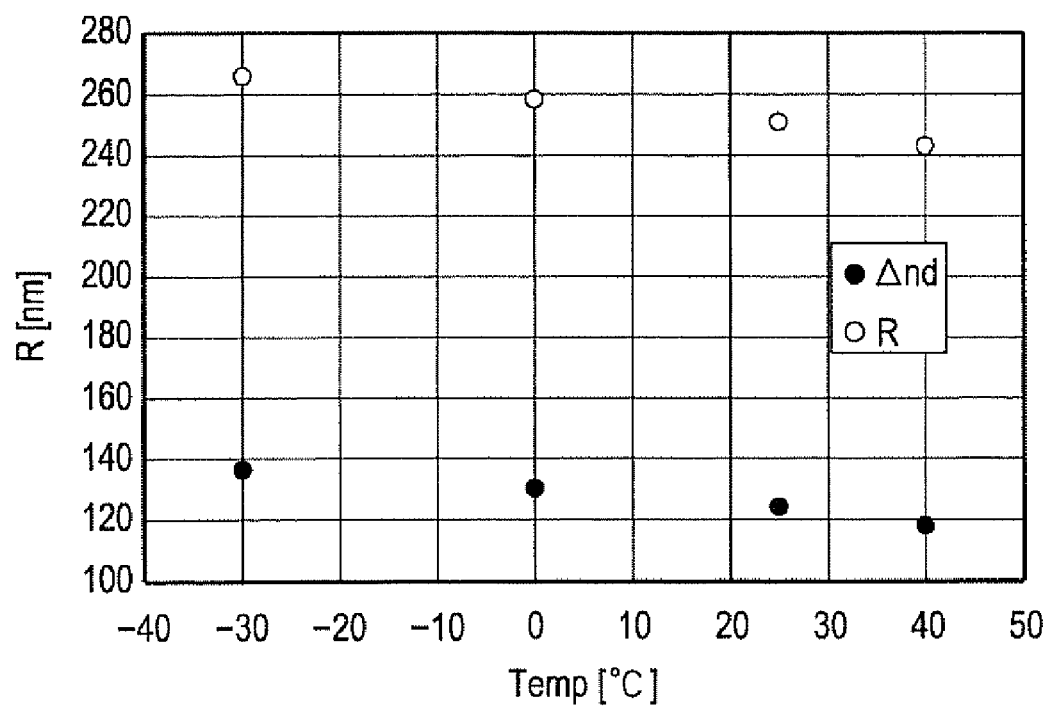
FIG. 6 is a graph showing, in a liquid crystal display, when the retardation Δnd of a liquid crystal layer is changed, the optimum value of the retardation of a retardation film.
Figure 7:
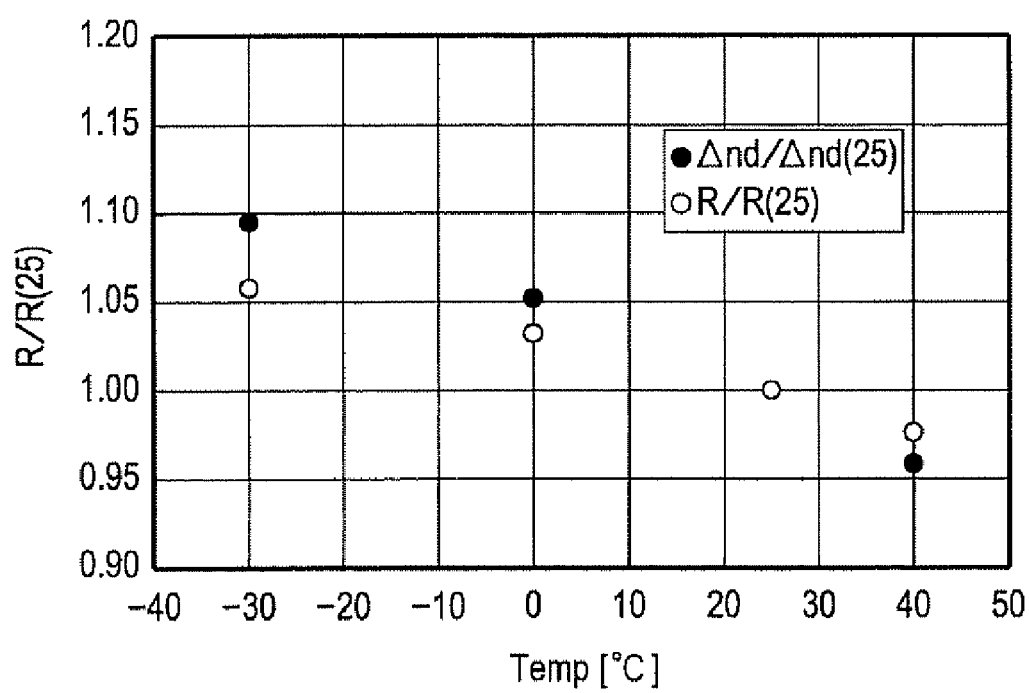
FIG. 7 is a graph showing the result shown in FIG. 6 in a change rate (temperature dependency) based on a temperature of 25° C.

FIG. 4 is a graph showing temperature dependency (change rate of $\Delta n$ at 25° C.) of birefringences $\Delta n$ of two liquid crystal materials having NI points (nematic/isotropic phase transition temperature) of 95° C. and 110° C., respectively. FIG. 5 is a graph showing, in the liquid crystal display 100 of this embodiment, when the retardation $\Delta nd$ of the liquid crystal layer 50 is changed, a simulation result on the range of the retardation R of the retardation film 27 satisfying the condition that emittance (reflectance) is less than 0.4%. In FIG. 5, when the retardation $\Delta nd$ of the liquid crystal layer 50 with respect to light of a wavelength of 550 nm is changed, the range of the retardation R of the retardation film 27 satisfying the condition that the emittance is less than 0.4% is indicated by a mark P. In the range indicated by the mark P, a difference between the retardation R of the retardation film 27 and the retardation $\Delta nd$ of the liquid crystal layer 50 is indicated by a mark R. In addition, a linear approximation equation in the range indicated by the mark P is represented by a line Q. FIG. 6 is a graph showing, on the basis of the results shown in FIGS. 4 and 5, the value of the retardation $\Delta nd$ of the liquid crystal layer 50 at each temperature and in such a case, the optimum value of the retardation R of the retardation film 27 read from FIG. 5, both of which are indicated by filled circles. FIG. 7 is a graph showing the result shown in FIG. 6 in a change rate (temperature dependency) based on a temperature of 25° C. In FIG. 77 the temperature dependency of the retardation $\Delta nd$ of the liquid crystal layer 50 is indicated by a filled circle, and the temperature dependency of the retardation film 27 is indicated by an open circle.

In the liquid crystal display 100, even if the retardation of the liquid crystal layer 50 in the reflective region 100r with respect to light of a wavelength of 550 nm is set to be quarter wavelength at 25° C., and the retardation of the retardation film 27 with respect to light of a wavelength of 550 nm is set to be half wavelength at 25° C., as shown in FIG. 4, the birefringence $\Delta n$ of the liquid crystal layer 50 or the liquid crystal material used for the retardation film 27 changes depending on the temperature. For this reason, even if the retardation of the liquid crystal layer 50 in the reflective region 100r is set to be quarter wavelength, and the retardation of the retardation film 27 with respect to light of a wavelength of 550 nm is set to be half wavelength, for example, at 25° C., if the usage environment temperature changes, when no voltage is applied, achromatic dark display is not achieved in the reflective region 100r, and contrast is degraded.

So, first, when the retardation $\Delta nd$ of the liquid crystal layer 50 with respect to light of a wavelength of 550 nm is changed, the range of the retardation R of the retardation film 27 satisfying the condition that the emittance is less than 0.4% has been examined through a simulation. As a result, as the range of the retardation R of the retardation film 27 satisfying the condition, the results indicated by the marks P and R in FIG. 5 have been obtained. In addition, if the value indicated by the mark P in FIG. 5 is represented by a linear approximation equation (line Q), the following expression is obtained.

$$R = 1.2067 \times \Delta nd + 101.55 \text{ (nm)}$$

In addition, on the basis of the results shown in FIGS. 4 and 5, the value of the retardation $\Delta nd$ of the liquid crystal layer 50 at each temperature and in such a case, the optimum value of the retardation R of the retardation film 27 are calculated. Then, if the result shown in FIG. 6 is converted into the change rate (temperature dependency) based on a temperature of 25° C., the results shown in Table 1 and FIGS. 6 and 7 are obtained.

TABLE 1

| temperature (° C.) | liquid crystal $\Delta nd$ | retardation film R | liquid crystal $\Delta nd/\Delta nd(25)$ | retardation film R/R(25) |
|---|---|---|---|---|
| 40 | 118.8 | 245.0 | 0.958 | 0.976 |
| 25 | 124.0 | 251.0 | 1.000 | 1.000 |
| 0 | 130.5 | 259.0 | 1.052 | 1.032 |
| −30 | 135.8 | 265.5 | 1.095 | 1.058 |

As a result, as shown in FIG. 7, it has been found the condition that the temperature dependency of the retardation R of the retardation film 27 is smaller than the temperature dependency of the retardation $\Delta nd$ of the liquid crystal layer 50 satisfies the condition that the emittance (reflectance) is less than 0.4%. This result shows that, if a liquid crystal material having an NI point of 130° C. is used for the retardation film 27, an optimum condition can be obtained.

Accordingly, in this embodiment, at the time of forming the liquid crystal layer 50 and the retardation film 27, liquid crystal materials that cause the temperature dependency of the retardation R of the retardation film 27 to be smaller than the temperature dependency of the retardation $\Delta nd$ of the liquid crystal layer 50 are used. Therefore, according to this embodiment, when no voltage is applied, achromatic dark display can be performed in the reflective region 100r over a wide temperature range, and image display with high contrast can be performed. As a result, the liquid crystal display 100 can perform high-quality image display even if the usage environment temperature is changed.

Second Embodiment

Figure 8A:
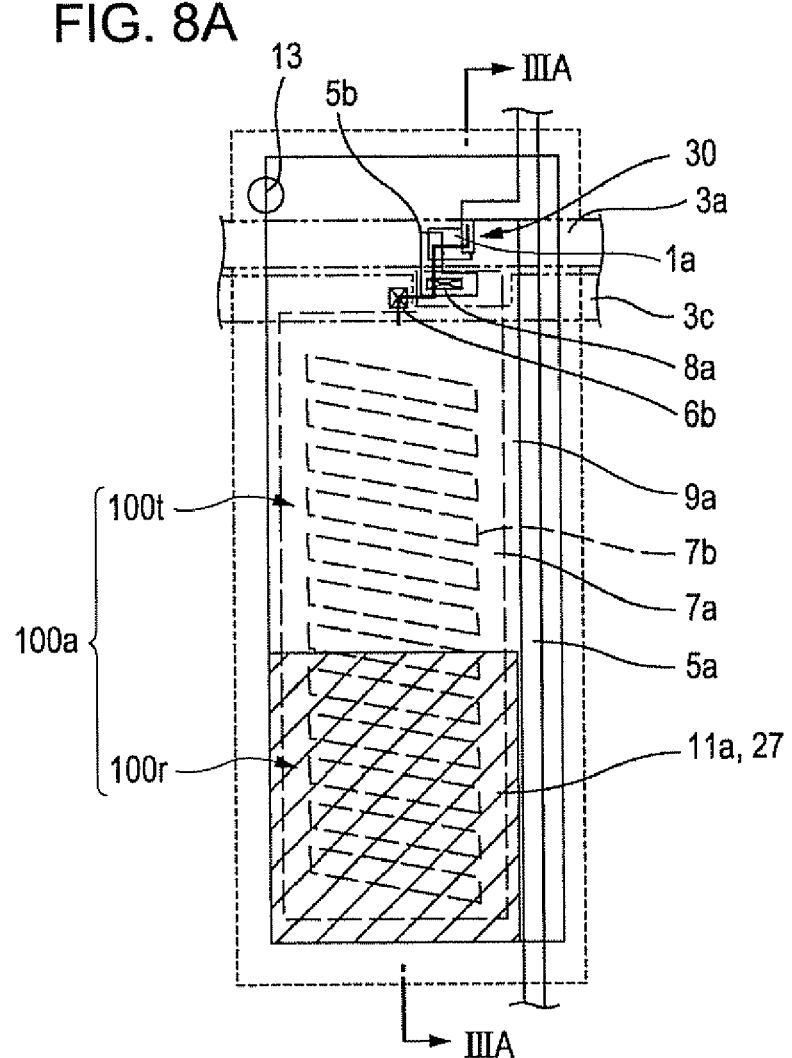
FIG. 8A is a plan view showing a pixel in a liquid crystal display according to a second embodiment of the invention.
Figure 8B:
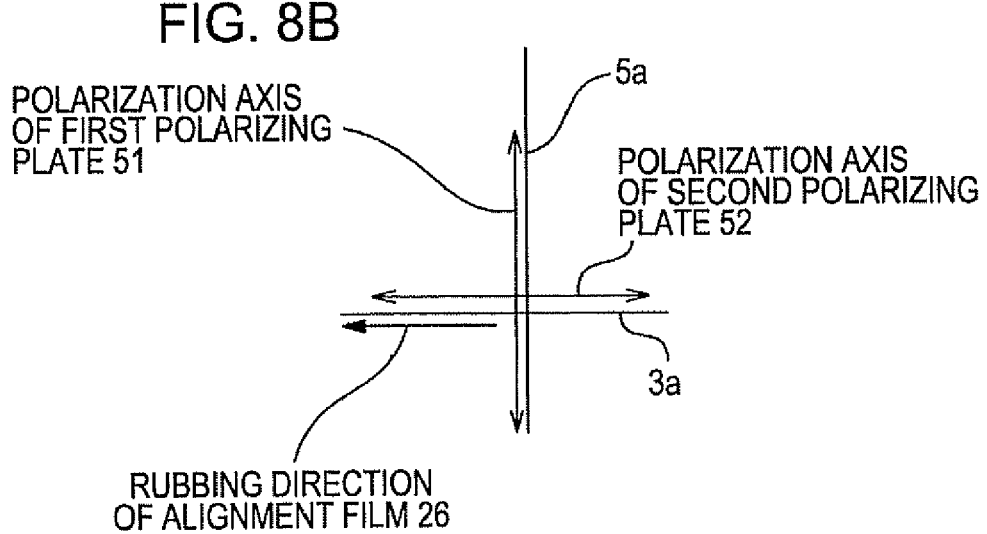

FIG. 8A is a plan view showing a pixel in a liquid crystal display 100 according to a second embodiment of the invention. FIG. 8B is an explanatory view showing the arrangement directions of polarizing plates and the like. The section taken along the line IIIA-IIIA of FIG. 8A is as shown in FIG. 3A. That is, the principal configuration of this embodiment is the same as that of the first embodiment. Therefore, the same parts are represented by the same reference numerals, and the descriptions thereof will be omitted.

As shown in FIG. 8A, similarly to the first embodiment, the liquid crystal display 100 of this embodiment is a transflective liquid crystal display. And, each of a plurality of pixels 100a has a transmissive region loot where image display is performed in a transmissive mode and a reflective region 100r where image display is performed in a reflective mode. In addition, a retardation film 27 formed of a liquid crystal polymer is formed on the inner surface of the counter substrate 20 (a surface on which the liquid crystal layer 50 is disposed) to correspond to the reflective region 100r.

In the liquid crystal display 100 having the above-described configuration, as the liquid crystal display 100 is viewed from a normal direction, a plurality of slit-shaped openings 7b are formed in parallel with each other at predetermined intervals, and extend at 50 in a clockwise direction with respect to the scanning line 3a. Therefore, as shown in FIG. 5B, the alignment film 26 on the counter substrate 20 side is subjected to a rubbing treatment in parallel with the scanning line 3a. Further, the alignment film 16 on the element substrate 10 side is subjected to a rubbing treatment in a direction opposite to the rubbing direction of the alignment film 26. For this reason, the alignment film 16 or 26 is subjected to the rubbing treatment at 5° in a counterclockwise direction with respect to the extension direction of the openings 7b.

The first polarizing plate 51 and the second polarizing plate 52 are arranged such that their polarization axes are perpendicular to each other. Further, the polarization axis of the first polarizing plate 51 is perpendicular to the rubbing direction of the alignment film 16 or 26, and the polarization axis of the second polarizing plate 52 is in parallel with the rubbing direction of the alignment film 16 or 26.

In the liquid crystal display 100 having the above-described configuration, similarly to the first embodiment, the retardation Δnd of the liquid crystal layer 50 in the reflective region 100r is set to be quarter wavelength, and the retardation R of the retardation film 27 is set to be half wavelength. In addition, at the time of forming the liquid crystal layer 50 and the retardation film 27, liquid crystal materials that cause the temperature dependency of the retardation R of the retardation film 27 to be smaller than the temperature dependency of the retardation Δnd of the liquid crystal layer 50 are used. For this reason, according to this embodiment, when no voltage is applied, achromatic dark display can be achieved in the reflective region 100r over a wide temperature range, and image display with high contrast can be performed. As a result, the liquid crystal display 100 can perform high-quality image display even if the usage environment temperature is changed.

Third Embodiment

Figure 9A:
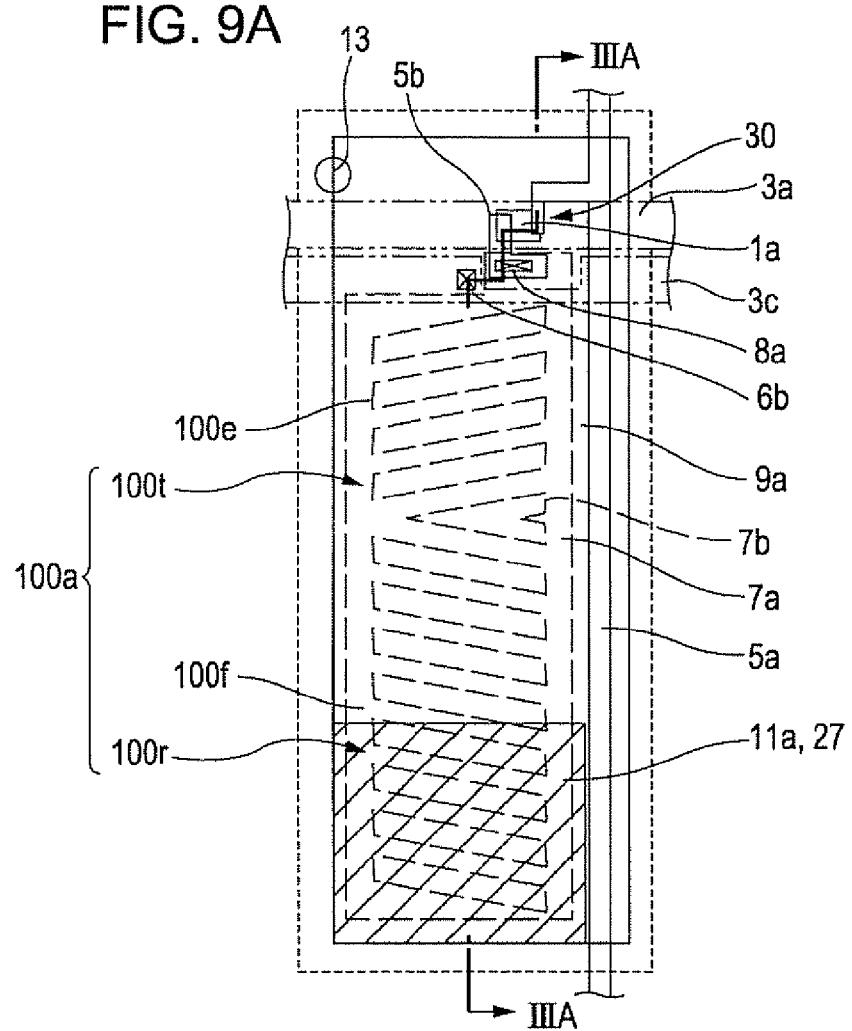
FIG. 9A is a plan view showing a pixel in a liquid crystal display according to a third embodiment of the invention.
Figure 9B:
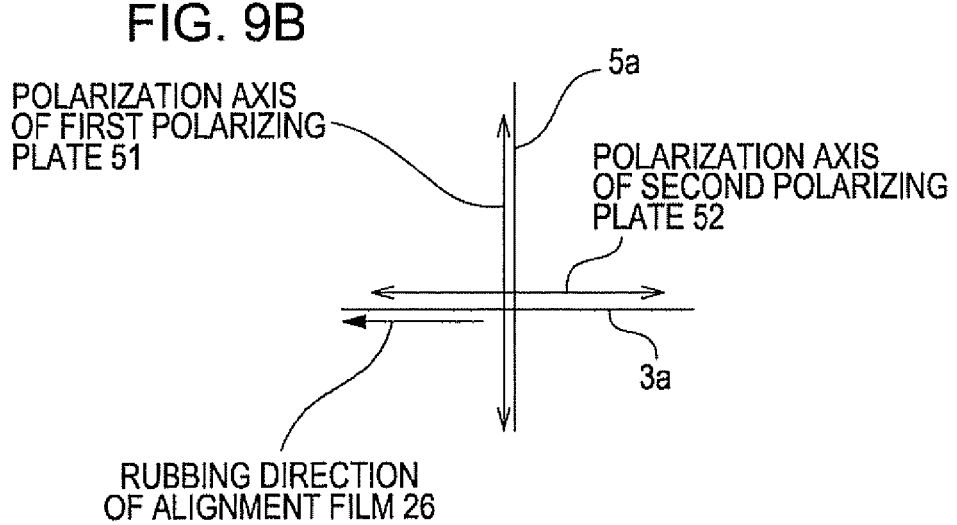

FIG. 9A is a plan view showing a pixel in a liquid crystal display 100 according to a third embodiment of the invention. FIG. 9B is an explanatory view showing the arrangement directions of polarizing plates and the like, The section taken along the line IIIA-IIIA of FIG. 9A is as shown in FIG. 3A. That is, the principal configuration of this embodiment is the same as that of the first embodiment. Therefore, the same parts are represented by the same reference numerals, and the descriptions thereof will be omitted.

As shown in FIG. 9A, similarly to the first embodiment, the liquid crystal display 100 of this embodiment is a transflective liquid crystal display. And, each of a plurality of pixels 100a has a transmissive region loot where image display is performed in a transmissive mode and a reflective region 100r where image display is performed in a reflective mode. In addition, a retardation film 27 formed of a liquid crystal polymer is formed on the inner surface of the counter substrate 20 (a surface on which the liquid crystal layer 50 is disposed) to correspond to the reflective region 100r.

In the liquid crystal display 100 having the above-described configuration, as the liquid crystal display 100 is viewed from a normal direction, in one region 100e and the other region 100f of the pixel 100a along the extension direction of the data line 5a, a plurality of slit-shaped openings 7b are inclined in opposite directions with respect to the scanning line 3a. That is, the pixel 100a has a two-domain structure. Specifically, in one region 100e of the pixel 100a, the slit-shaped openings 7b are inclined at 5° in a counterclockwise direction with respect to the scanning line 3a. Meanwhile, in the other region 100f, the slit-shaped openings 7b are inclined at 5° in a clockwise direction with respect to the scanning line 3a. In this embodiment, as shown in FIG. 9B, the alignment film 26 on the counter substrate 20 side is subjected to a rubbing treatment in parallel with the scanning line 3a. Further, the alignment film 16 on the element substrate 10 side is subjected to a rubbing treatment in a direction opposite to the rubbing direction of the alignment film 26. For this reason, the alignment film 16 or 26 is subjected to the rubbing treatment at 50 in the extension direction of the openings 7b. In addition, in one region 100e and the other region 100f, the slit-shaped openings 7b are inclined in opposite directions with respect to the direction of the rubbing treatment.

The first polarizing plate 51 and the second polarizing plate 52 are arranged such that their polarization axes are perpendicular to each other. Further, the polarization axis of the first polarizing plate 51 is perpendicular to the rubbing direction of the alignment film 16 or 26, and the polarization axis of the second polarizing plate 52 is in parallel with the rubbing direction of the alignment film 16 or 26.

In the liquid crystal display 100 having the above-described configuration, similarly to the first embodiment, the retardation Δnd of the liquid crystal layer 50 in the reflective region 100r is set to be quarter wavelength, and the retardation R of the retardation film 27 is set to be half wavelength. In addition, at the time of forming the liquid crystal layer 50 and the retardation film 27, liquid crystal materials that cause the temperature dependency of the retardation R of the retardation film 27 to be smaller than the temperature dependency of the retardation Δnd of the liquid crystal layer 50 are used. For this reason, according to this embodiment, when no voltage is applied, achromatic dark display can be achieved in the reflective region 100r over a wide temperature range, and image display with high contrast can be performed. As a result, the liquid crystal display 100 can perform high-quality image display even if the usage environment temperature is changed.

Furthermore, since the pixel 100a has the two-domain structure, the liquid crystal layer 50 when a voltage is applied is aligned in two directions. For this reason, in the right half and the left half of the pixel 100a, azimuth angle dependency of a visual angle is cancelled, whereby visual angle symmetry is improved. In regards to the reflective region 100r of the liquid crystal display 100, similarly to the region 100e and the region 100f, a two-domain structure in which the openings 7b are inclined in opposite directions may be used.

Fourth Embodiment

Figure 10A:
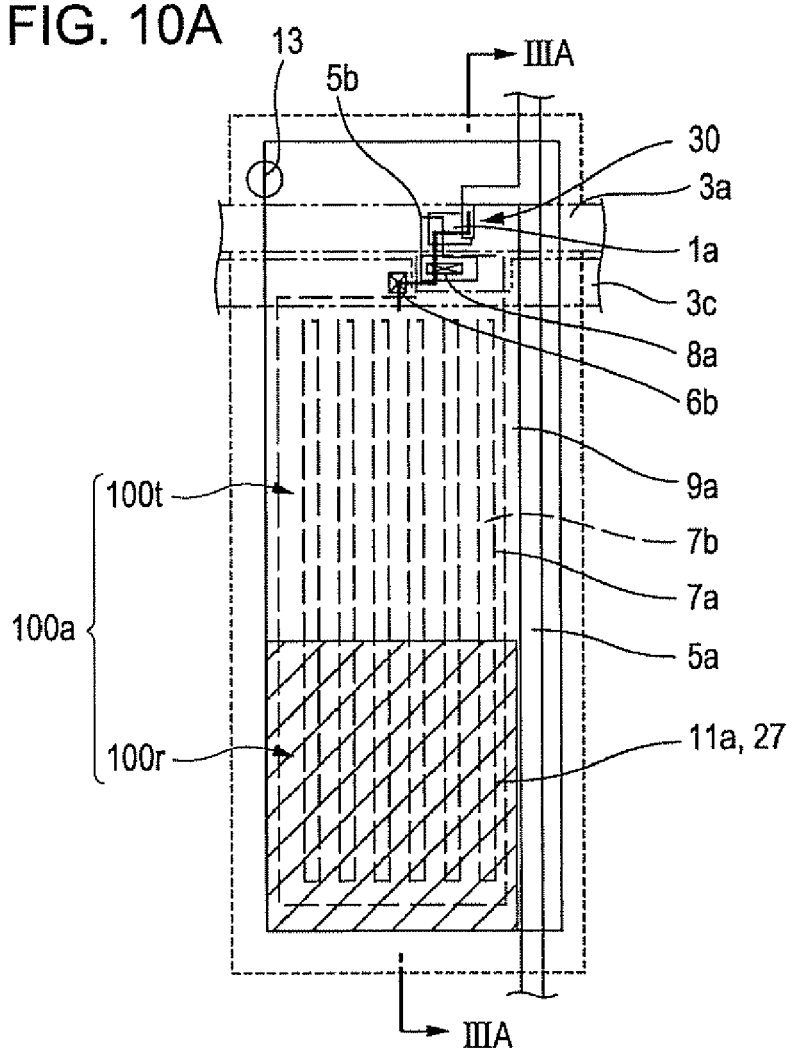
FIG. 10A is a plan view showing a pixel in a liquid crystal display according to a fourth embodiment of the invention.
Figure 10B:
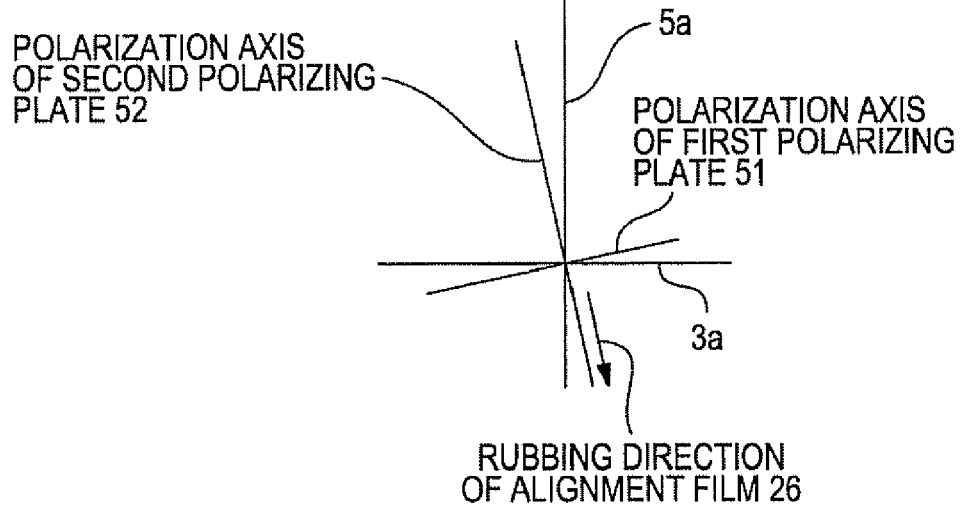

FIG. 10A is a plan view showing a pixel in a liquid crystal display 100 according to a fourth embodiment of the invention. FIG. 10B is an explanatory view showing the arrangement directions of the polarizing plate and the like. The section taken along the line IIIA-IIIA of FIG. 10A is as shown in FIG. 3A. That is, the principal configuration of this embodiment is the same as that of the first embodiment. Therefore, the same parts are represented by the same reference numerals, and the descriptions thereof will be omitted.

As shown in FIG. 10A, similarly to the first embodiment, the liquid crystal display 100 of this embodiment is a transflective liquid crystal display. And, each of a plurality of pixels 100a has a transmissive region loot where image display is performed in a transmissive mode and a reflective region 100r where image display is performed in a reflective mode. In addition, a retardation film 27 formed of a liquid crystal polymer is formed on the inner surface of the counter substrate 20 (a surface on which the liquid crystal layer 50 is disposed) to correspond to the reflective region 100r.

In the liquid crystal display 100 having the above-described configuration, as the liquid crystal display 100 is viewed from a normal direction, a plurality of slit-shaped openings 7b extend in parallel with the data line 5a, and are perpendicular to the scanning line 3a. In this embodiment, as shown in FIG. 10B, the alignment film 26 on the counter substrate 20 side is subjected to a rubbing treatment at 85° in a clockwise direction with respect to the scanning line 3a. Further, the alignment film 16 on the element substrate 10 side is subjected to a rubbing treatment in a direction opposite to the rubbing direction of the alignment film 26. For this reason, the alignment film 16 or 26 is subjected to the rubbing treatment at 50 in a counterclockwise direction with respect to the extension direction of the openings 7b.

The first polarizing plate 51 and the second polarizing plate 52 are arranged such that their polarization axes are perpendicular to each other. Further, the polarization axis of the first polarizing plate 51 is perpendicular to the rubbing direction of the alignment film 16 or 26, and the polarization axis of the second polarizing plate 52 is in parallel with the rubbing direction of the alignment film 16 or 26.

In the liquid crystal display 100 having the above-described configuration, similarly to the first embodiment, the retardation Δnd of the liquid crystal layer 50 in the reflective region 100r is set to be quarter wavelength, and the retardation R of the retardation film 27 is set to be half wavelength. In addition, at the time of forming the liquid crystal layer 50 and the retardation film 27, liquid crystal materials that cause the temperature dependency of the retardation R of the retardation film 27 to be smaller than the temperature dependency of the retardation Δnd of the liquid crystal layer 50 are used. For this reason, according to this embodiment, when no voltage is applied, achromatic dark display can be achieved in the reflective region 100r over a wide temperature range, and image display with high contrast can be performed. As a result, the liquid crystal display 100 can perform high-quality image display even if the usage environment temperature is changed.

In the first embodiment, the openings 7b extend in the short-side direction of the pixel electrode 7a (parallel to the scanning line 3a). In contrast, in this embodiment, the openings 7b extend in a long-side direction of the pixel electrode 7a (parallel to the data line 5a). At an end along the extension direction of the openings 7b, the liquid crystal layer 50 cannot be favorably aligned, and thus the end does not substantially contribute to display. In this embodiment, the end that does not contribute to display is disposed along the short-side direction of the pixel electrode 7a. Therefore, in the region of the pixel 100a, a portion that does not substantially contribute to display can be made small. As a result, according to this embodiment, more bright display can be achieved.

Fifth Embodiment

Figure 11A:
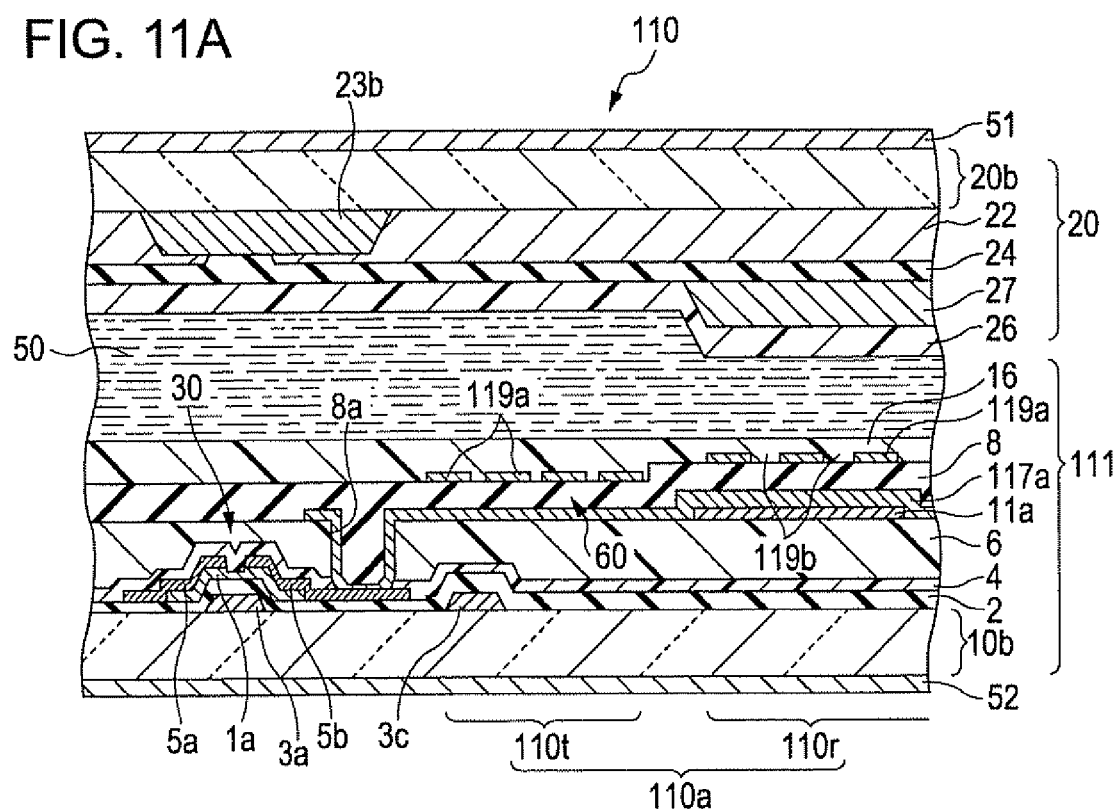
FIG. 11A is a cross-sectional view of a pixel in a liquid crystal display according to a fifth embodiment taken along the line XIA-XIA of FIG. 11B.
Figure 11B:
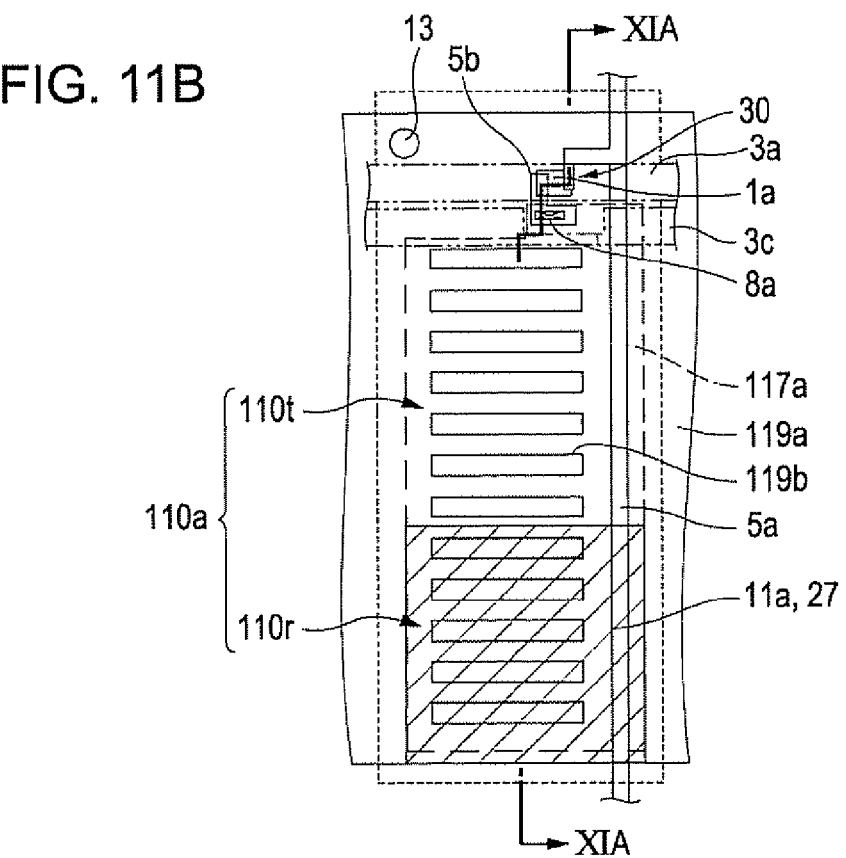
FIG. 11B is a plan view corresponding to FIG. 11A.

FIG. 11A is a cross-sectional view of a pixel in a liquid crystal display 110 according to a fifth embodiment of the invention. FIG. 11B is a plan view corresponding to FIG. 11A. FIG. 11A is a cross-sectional view of the liquid crystal display 110 taken along the line XIA-XIA of FIG. 11B. In the liquid crystal display 110 of this embodiment, a pixel electrode and a common electrode have structures different from those in the first embodiment. Hereinafter, a description will be given laying focus on the differences. Moreover, the same parts as those in the first embodiment are represented by the same reference numerals, and the descriptions thereof will be omitted.

As shown in FIGS. 11A and 11B, similarly to the first embodiment, the liquid crystal display 110 of this embodiment is a transflective liquid crystal display. And, each of a plurality of pixels 110a has a transmissive region 110t where image display is performed in a transmissive mode and a reflective region 110r where image display is performed in a reflective mode. In addition, a retardation film 27 formed of a liquid crystal polymer is formed on the inner surface of the counter substrate 20 (a surface on which the liquid crystal layer 50 is disposed) to correspond to the reflective region 110r.

In the liquid crystal display 110 having the above-described configuration, a common electrode 119a on an element substrate 111 is arranged closer to the liquid crystal layer 50 than the pixel electrode 117a. That is, in the element substrate 111, the gate insulating layer 2, the protective film 4, the resin layer 6, the pixel electrode 117a, the inter-electrode insulating film 8, the common electrode 119a, and the alignment film 16 are sequentially laminated on the transparent substrate 10b. Further, in the reflective region 110r, the pixel electrode 117a, the inter-electrode insulating film 8, the common electrode 119a, and the alignment film 16 are laminated on the light reflecting layer 11a.

The pixel electrode 117a is electrically connected to the drain electrode 5b via a contact hole 8a, which is formed in the resin layer 6 and the protective film 4. The common electrode 119a is formed over the plurality of pixels 110a. Here, the pixel electrode 117a is formed on the entire surface of the substrate, and a plurality of slit-shaped openings 119b (indicated by solid lines) are formed in the common electrode 119a. The plurality of slit-shaped openings 119b are formed in parallel with each other and extend in parallel with the scanning line 3a (a short-side direction of the pixel 110a). For this reason, similarly to the first embodiment, the direction of the electric field is perpendicular to the scanning line 3a. In addition, the rubbing direction of the alignment film 26 is the same as that of the first embodiment.

In the liquid crystal display 110 having the above-described configuration, similarly to the first embodiment, the retardation Δnd of the liquid crystal layer 50 in the reflective region 110r is set to be quarter wavelength, and the retardation R of the retardation film 27 is set to be half wavelength. In addition, at the time of forming the liquid crystal layer 50 and the retardation film 27, liquid crystal materials that cause the temperature dependency of the retardation R of the retardation film 27 to be smaller than the temperature dependency of the retardation Δnd of the liquid crystal layer 50 are used. For this reason, according to this embodiment, when no voltage is applied, achromatic dark display can be achieved in the reflective region 110r over a wide temperature range, and image display with high contrast can be performed. As a result, the liquid crystal display 110 can perform high-quality image display even if the usage environment temperature is changed. Furthermore, since the common electrode 119a is formed over the plurality of pixels 110a, the ratio (aperture ratio) of a portion, which substantially contributes to display, in the region of the pixel 110a can be increased.

The common electrode 119a may be formed for each pixel 110a. Furthermore, in the liquid crystal display 110 of this embodiment, the openings 119b of the common electrode 119a may have the same structure as the openings 7b of the pixel electrode 7a in the second embodiment, the third embodiment, and the fourth embodiment.

Sixth Embodiment

Figure 12A:
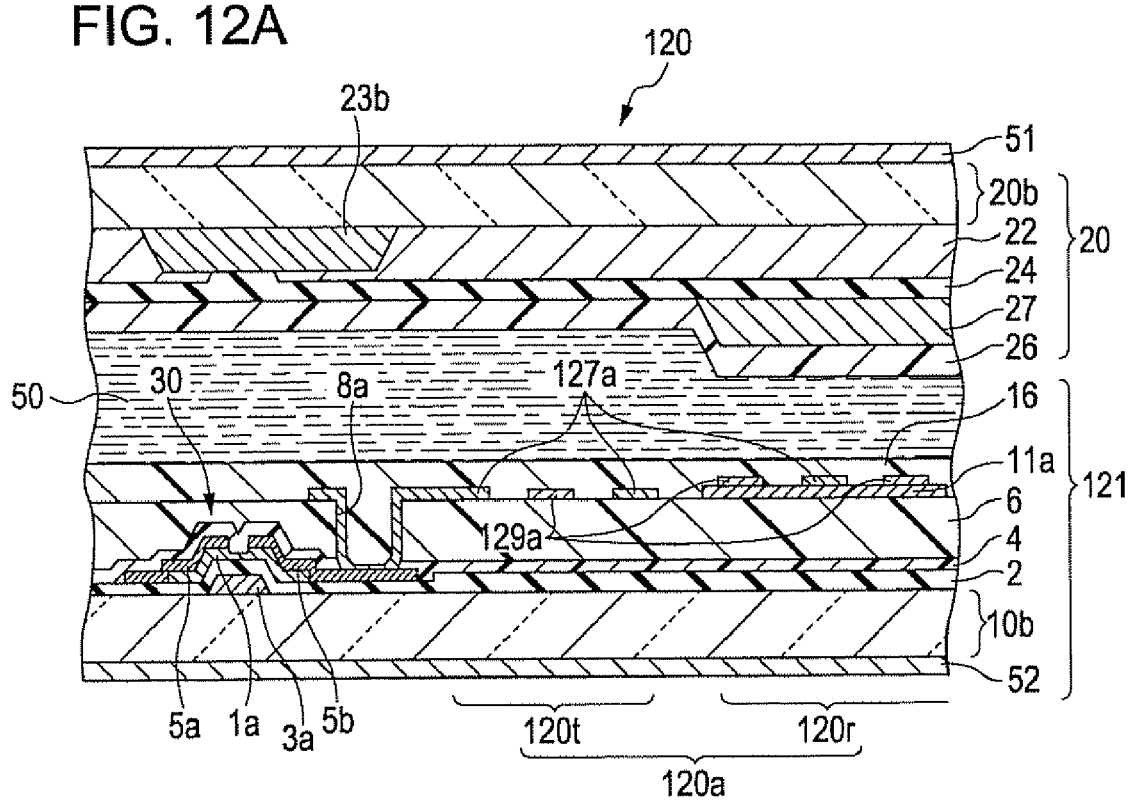
FIG. 12A is a cross-sectional view of a pixel in a liquid crystal display according to a sixth embodiment of the invention taken along the line XIIA-XIIA of FIG. 12B.
Figure 12B:
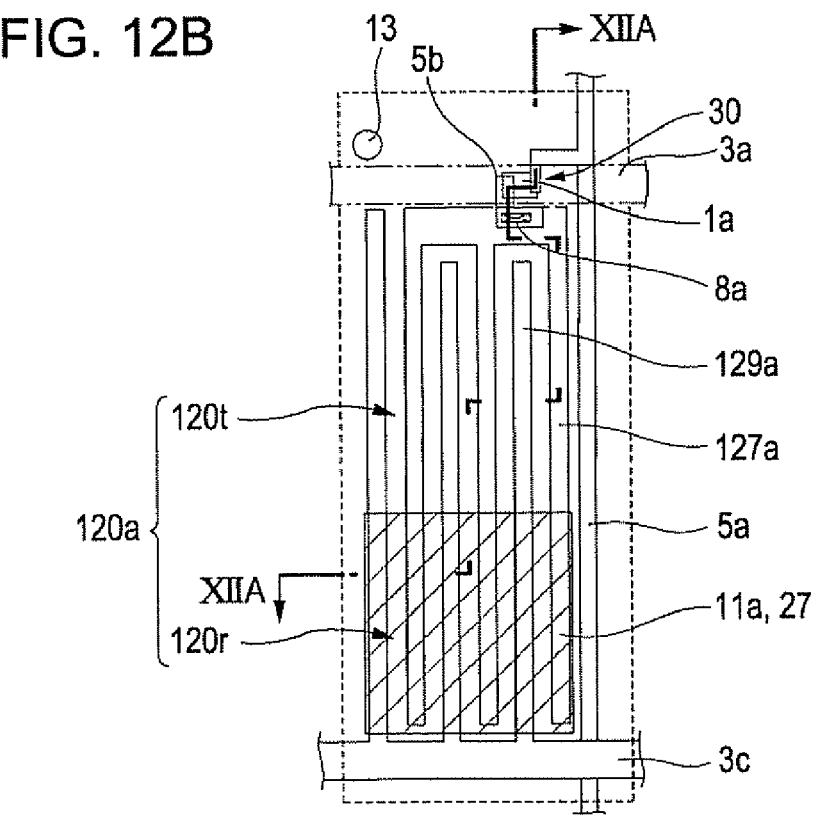
FIG. 12B is a plan view corresponding to FIG. 12A.

FIG. 12A is a cross-sectional view of a pixel in a liquid crystal display 120 according to a sixth embodiment of the invention. FIG. 12B is a plan view corresponding to FIG. 12A. FIG. 12A is a cross-sectional view of the liquid crystal display 120 taken along the line XIIA-XIIA of FIG. 12B. In the liquid crystal display 120 of this embodiment, a pixel electrode and a common electrode have structures different from those in the first embodiment. Hereinafter, a description will be given laying focus on the differences. Moreover, the same parts as those in the first embodiment are represented by the same reference numerals, and the descriptions thereof will be omitted. In FIG. 12B, a pixel electrode 127a is indicated by a solid line.

As shown in FIGS. 12A and 12B, similarly to the first embodiment, the liquid crystal display 120 of this embodiment is a transflective liquid crystal display. And, each of a plurality of pixels 120a has a transmissive region 120t where image display is performed in a transmissive mode and a reflective region 120r where image display is performed in a reflective mode. In addition, a retardation film 27 formed of a liquid crystal polymer is formed on the inner surface of the counter substrate 20 (a surface on which the liquid crystal layer 50 is disposed) to correspond to the reflective region 120r.

The liquid crystal display 120 of this embodiment drives the liquid crystal layer 50 in an IPS mode. In the liquid crystal display 120 having the above-described configuration, the pixel electrode 127a and the common electrode 129a are formed on the resin layer 6 together, and the alignment film 16 is formed thereon. In the reflective region 120r, the pixel electrode 127a and the common electrode 129a are formed on the light reflecting layer 11a, and the alignment film 16 is formed thereon. The pixel electrode 127a is electrically connected to the drain electrode 5b via a contact hole 8a, which is formed in the resin layer 6 and the protective film 4. The common electrode 129a is formed integrally with the common line 3c, and is electrically connected to the common electrode 129a of a neighboring pixel 120a via the common line 3c.

The pixel electrode 127a and the common electrode 129a have a comb shape, and the tooth portions in the comb shape are arranged in alternate relationship to face each other. The tooth portions in the comb shape of each of the pixel electrode 127a and the common electrode 129a extend in parallel with the data line 5a and are perpendicular to the scanning line 3a. For this reason, the direction of the electric field is the same as that in the fourth embodiment, and is in parallel with the scanning line 3a. In addition, the rubbing direction of the alignment film 26 is the same as that in the fourth embodiment.

In the liquid crystal display 120 having the above-described configuration, similarly to the first embodiment, the retardation Δnd of the liquid crystal layer 50 in the reflective region 120r is set to be quarter wavelength, and the retardation R of the retardation film 27 is set to be half wavelength. In addition, at the time of forming the liquid crystal layer 50 and the retardation film 27, liquid crystal materials that cause the temperature dependency of the retardation R of the retardation film 27 to be smaller than the temperature dependency of the retardation Δnd of the liquid crystal layer 50 are used. For this reason, according to this embodiment, when no voltage is applied, achromatic dark display can be achieved in the reflective region 120r in a wide temperature range, and image display with high contrast can be performed. As a result, the liquid crystal display 120 can perform high-quality image display even if the usage environment temperature is changed.

Seventh Embodiment

Figure 13:
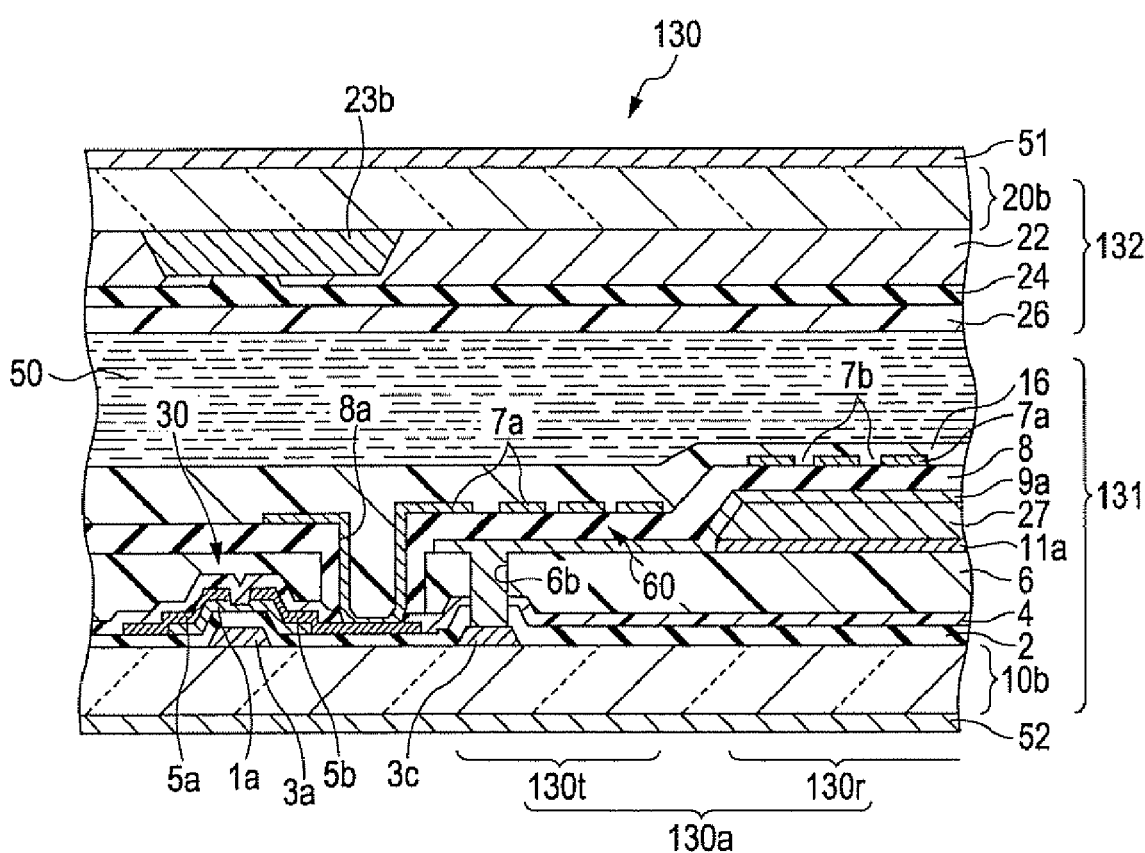
FIG. 13 is a cross-sectional view of a pixel in a liquid crystal display according to a seventh embodiment of the invention.

FIG. 13 is a cross-sectional view of a pixel in a liquid crystal display 130 according to a seventh embodiment of the invention. The liquid crystal display 130 of this embodiment is different from the first embodiment in that a retardation film 27 is formed on the element substrate, not the counter substrate. Hereinafter, a description will be given laying focus on the difference. The same parts as those in the first embodiment are represented by the same reference numerals, and the descriptions thereof will be omitted. The surface when FIG. 13 is viewed from the normal direction of the first polarizing plate 51 is as shown in FIG. 3B.

As shown in FIG. 13, similarly to the first embodiment, the liquid crystal display 130 of this embodiment is a transflective liquid crystal display. And, each of a plurality of pixels 130a has a transmissive region 130t where image display is performed in a transmissive mode and a reflective region 130r where image display is performed in a reflective mode. However, a retardation film 27 formed of a liquid crystal polymer is formed on the inner surface of an element substrate 131 (a surface on which the liquid crystal layer 50 is disposed) to correspond to the reflective region 130r.

In the liquid crystal display 130 having the above-described configuration, in the element substrate 131, the gate insulating layer 2, the protective film 4, the resin layer 6, the common electrode 9a, the inter-electrode insulating film 8, the pixel electrode 7a, and the alignment film 16 are sequentially laminated on the transparent substrate 10b. In the reflective region 130r, the retardation film 27 is formed on the light reflecting layer 11a, and the common electrode 9a, the inter-electrode insulating film 8, the pixel electrode 7a, and the alignment film 16 are laminated on the retardation film 27. Therefore, on the counter substrate 132, the retardation film 27 is not formed.

In the liquid crystal display 130 having the above-described configuration, similarly to the first embodiment, the retardation Δnd of the liquid crystal layer 50 in the reflective region 130r is set to be quarter wavelength, and the retardation R of the retardation film 27 is set to be half wavelength. In addition, at the time of forming the liquid crystal layer 50 and the retardation film 27, liquid crystal materials that cause the temperature dependency of the retardation R of the retardation film 27 to be smaller than the temperature dependency of the retardation Δnd of the liquid crystal layer 50 are used. For this reason, according to this embodiment, when no voltage is applied, achromatic dark display can be achieved in the reflective region 130r over a wide temperature range, and image display with high contrast can be performed. As a result, the liquid crystal display 130 can perform high-quality image display even if the usage environment temperature is changed. Furthermore, since the retardation film 27 is formed on the light reflecting layer 11a, the relative positioning accuracy of the retardation film 27 and the light reflecting layer 11a is improved. For this reason, this embodiment is suitable for a high-definition liquid crystal display. Furthermore, in the reflective region 130r, the retardation film 27 is formed on the light reflecting layer 11a, and the common electrode 9a is formed on the entire surface of the retardation film 27. Therefore, since the common electrode 9a is disconnected on the light reflecting layer 11a, electric field distortion does not occur.

The liquid crystal display 130 may have a structure in which the element substrate 131 is arranged on the emitting side of display light. In this case, the retardation film 27 and the light reflecting layer 11a may be formed on the inner surface of the counter substrate 132. Further, the retardation film 27 may be formed on the element substrate 131, and the light reflecting layer 11a may be formed on the counter substrate 132.

Although, in the foregoing embodiments, a case in which an amorphous silicon film is used as a semiconductor film has been described, the invention may be applied to an element substrate 10, which uses a polysilicon film or a monocrystalline silicon layer. In addition, the invention may be applied to a liquid crystal display, which uses a thin film diode (non-linear element) as a pixel switching element.

Although, in the foregoing embodiments, the polarization axes of the first polarizing plate 51 and the second polarizing plate 52 have been illustrated, an absorption axis, instead of the polarization axis, may be illustrated.

Electronic Apparatus

Figure 14A:
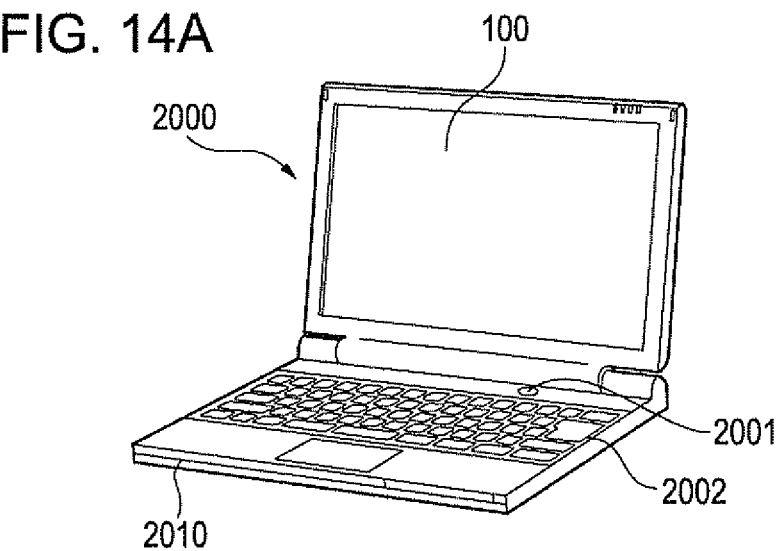
FIG. 14A is a diagram showing an electronic apparatus to which a liquid crystal display according to an embodiment of the invention is applied.
Figure 14B:
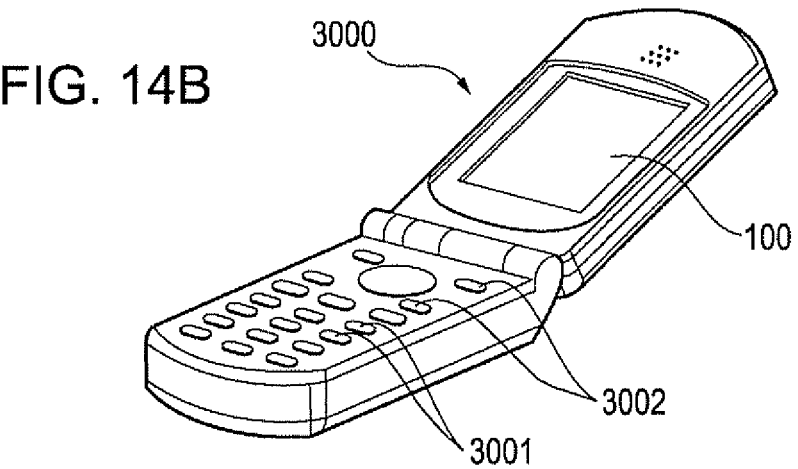
FIG. 14B is a diagram showing an electronic apparatus to which a liquid crystal display according to an embodiment of the invention is applied.
Figure 14C:
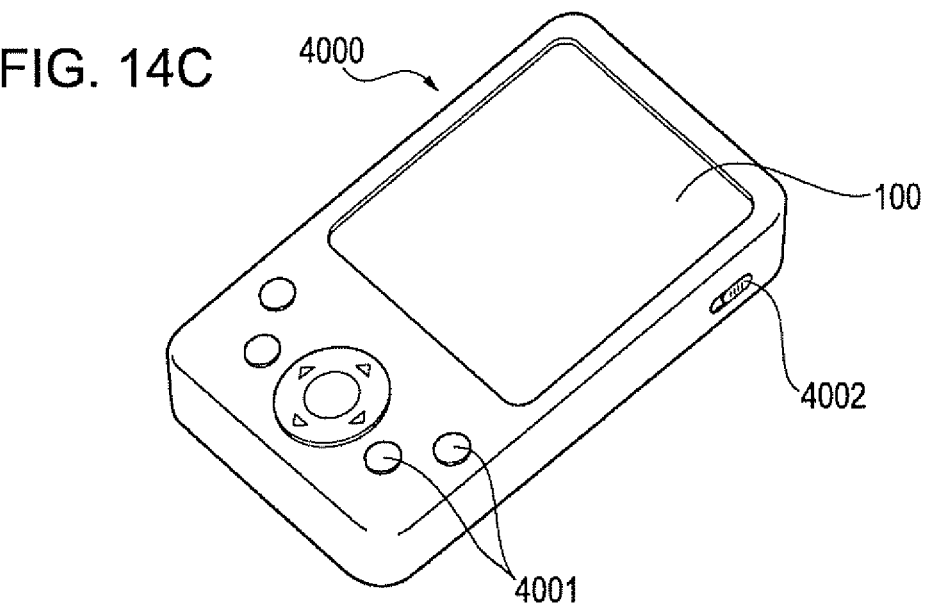
FIG. 14C is a diagram showing an electronic apparatus to which a liquid crystal display according to an embodiment of the invention is applied.

Next, an electronic apparatus, to which the liquid crystal display 100 according to the foregoing embodiment is applied, will be described. FIG. 14A shows the configuration of a mobile personal computer which includes the liquid crystal display 100. A personal computer 2000 includes the liquid crystal display 100 as a display unit and a main body 2010. In the main body 2010, a power supply switch 2001 and a keyboard 2002 are provided. FIG. 14B shows the configuration of a cellular phone which includes the liquid crystal display 100. A cellular phone 3000 includes a plurality of operating buttons 3001, a scroll button 3002, and the liquid crystal display 100 as a display unit. By operating the scroll button 3002, a screen displayed on the liquid crystal display 100 is scrolled. FIG. 14C shows the configuration of a personal digital assistant (PDA) to which the liquid crystal display 100 is applied. The personal digital assistant 4000 includes a plurality of operating buttons 4001, a power supply switch 4002, and the liquid crystal display 100 as a display unit. If the power supply switch 4002 is operated, various kinds of information, such as an address book, a scheduler, and the like, are displayed on the liquid crystal display 100.

The electronic apparatuses include a liquid crystal display 100 that, in the reflective mode, can perform image display with high contrast over the wide temperature range. Therefore, even if the usage environment temperature is changed, high-quality image display can be performed. Examples of the electronic apparatus, to which the liquid crystal display 100 is applied, includes, in addition to the electronic apparatuses shown in FIGS. 14A to 14C, a digital still camera, a liquid crystal television, a view-finder-type or monitor-direct-view-type video tape recorder, a car navigation device, a pager, an electronic organizer, an electronic calculator, a word processor, a work station, a video phone, a POS terminal, an apparatus having a touch panel, and the like. The above-described liquid crystal display 100 can be applied to these electronic apparatuses as a display unit. In addition, the liquid crystal display 110, 120, or 130 can also be applied to the electronic apparatuses as a display unit. In the electronic apparatus that includes the liquid crystal display 110, 120, or 130, even if the usage environment temperature is changed, high-quality image display can be performed.

What is claimed is:

1. A liquid crystal display, comprising:
an element substrate;
a pixel electrode that is formed at each pixel of the element substrate;
a common electrode that is formed on the element substrate, an electric field being formed between the pixel electrodes and the common electrode;
a counter substrate that is arranged to face the element substrate;
a liquid crystal layer that is formed between the counter substrate and the element substrate;
first and second polarizing plates that are provided on an emitting side of display light passing through the liquid crystal layer and an opposite side, respectively; and
a retardation film that is disposed between the liquid crystal layer and the first polarizing plate, wherein:
the pixel has a transmissive region where transmissive display light is emitted and a reflective region where reflective display light is emitted;
the retardation of the retardation film has smaller temperature dependency than that of the liquid crystal layer; and
one of the pixel electrode and the common electrode is formed on the element substrate facing the liquid crystal layer, and has a plurality of slit-shaped openings, which are formed within each region of the pixel at predetermined intervals.

2. The liquid crystal display according to claim 1, wherein the counter substrate is arranged on the emitting side of display light, and
the retardation film is formed on a surface of the counter substrate facing the liquid crystal layer.

3. The liquid crystal display according to claim 1, wherein, in the reflective region, a light reflecting layer is formed on a surface of the element substrate facing the liquid crystal layer, and
the retardation film is formed to overlap the light reflecting layer in plan view.

4. The liquid crystal display according to claim 1, wherein the pixel electrode is formed closer to the liquid crystal layer than the common electrode.

5. The liquid crystal display according to claim 1, wherein the common electrode is formed closer to the liquid crystal layer than the pixel electrode.

6. The liquid crystal display according to claim 1, wherein the pixel electrode and the common electrode are formed in the same layer in the element substrate and have a comb shape, and the tooth portions of the comb shape are arranged in alternate relationship to face each other.

7. An electronic apparatus comprising the liquid crystal display according to claim 1.

8. The liquid crystal display according to claim 1, wherein the retardation film is formed of a liquid crystal polymer, and the retardation of the retardation film is set at a ½ wavelength.

9. The liquid crystal display according to claim 1, wherein the retardation film is formed of a liquid crystal polymer, and a nematic phase transition temperature of the liquid crystal polymer is 130° C.

* * * * *